(12) United States Patent
Rezaei et al.

(10) Patent No.: US 11,738,324 B2
(45) Date of Patent: Aug. 29, 2023

(54) 3D PRINTED ZEOLITE MONOLITHS FOR $CO_2$ REMOVAL

(71) Applicant: The Curators of the University of Missouri, Columbia, MO (US)

(72) Inventors: Fateme Rezaei, Rolla, MO (US); Harshul V. Thakkar, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 17/689,344

(22) Filed: Mar. 8, 2022

(65) Prior Publication Data

US 2022/0250029 A1 Aug. 11, 2022

Related U.S. Application Data

(62) Division of application No. 16/136,957, filed on Sep. 20, 2018, now Pat. No. 11,298,675.

(Continued)

(51) Int. Cl.
| | |
|---|---|
| *B01J 20/16* | (2006.01) |
| *B01J 20/12* | (2006.01) |
| *B01D 53/02* | (2006.01) |
| *B01J 20/28* | (2006.01) |
| *B33Y 70/10* | (2020.01) |
| *B33Y 80/00* | (2015.01) |

(52) U.S. Cl.
CPC ............ *B01J 20/165* (2013.01); *B01D 53/02* (2013.01); *B01J 20/12* (2013.01); *B01J 20/2803* (2013.01); *B01J 20/28071* (2013.01); *B33Y 70/10* (2020.01); *B01D 2253/108* (2013.01); *B01D 2253/11* (2013.01); *B01D 2253/342* (2013.01); *B01D 2257/504* (2013.01); *B01D 2258/06* (2013.01); *B01J 2220/82* (2013.01); *B33Y 80/00* (2014.12)

(58) Field of Classification Search
CPC . B01J 20/16; B01J 20/165; B01J 20/12; B01J 20/2803; B01J 20/28071; B01J 2220/82
See application file for complete search history.

(56) References Cited

U.S. PATENT DOCUMENTS 9,283,512 B2 3/2016 Carruthers et al.
2016/0297685 A1 10/2016 Jones

OTHER PUBLICATIONS

Lefevere et al. (3D-printing of hierarchical porous ZSM-5: The importance of the binder system, Aug. 20, 2017, Materials and design, vol. 134, pp. 331-341, hereinafter "Lefevere"). (Year: 2017).*

(Continued)

*Primary Examiner* — Youngsul Jeong
(74) *Attorney, Agent, or Firm* — HOVEY WILLIAMS LLP

(57) ABSTRACT

Carbon dioxide ($CO_2$) capture materials comprising one or more 3D-printed zeolite monoliths for the capture and or removal of $CO_2$ from air or gases in enclosed compartments, including gases or mixtures of gases having less than about 5% $CO_2$. Methods for preparing 3D-printed zeolite monoliths useful as $CO_2$ capture materials and filters, as well as methods of removing $CO_2$ from a gas or mixture of gases in an enclosed compartment using 3D-printed zeolite monoliths are provided.

18 Claims, 16 Drawing Sheets

Related U.S. Application Data

(60) Provisional application No. 62/560,740, filed on Sep. 20, 2017.

(56) References Cited

OTHER PUBLICATIONS

Knox (Development of carbon dioxide removal systems for NASA's deep space human exploration missions 2016-2017, Jul. 16-20, 2017, International conference on environmental systems, Charleston, South Carolina). (Year: 2017).*

Zhou et al. (Three-dimensional printing for catalytic applications: Current status and perspectives, Jun. 12, 2017, Adv. Funct. Mater. vol. 27, 1701134) (Year: 2017).*

Lefevere et al., "3D-printing of hierarchical porous ZSM-5: The importance of the binder system," Aug. 20, 2017, Materials and Design, vol. 134, pp. 331-341.

Office Action dated Jul. 1, 2020 in corresponding U.S. Appl. No. 16/136,957, filed Sep. 20, 2018, 9 pages.

Office Action dated Jul. 30, 2020 in corresponding U.S. Appl. No. 16/136,957, filed Sep. 20, 2018, 7 pages.

Knox, "Development of Carbon Dioxide Removal Systems for NASA's Deep Space Human Exploration Missions 2016-2017," Jul. 16-20, 2017, 47th International Conference on Environmental Systems, Charleston, South Carolina, 17 pages.

Office Action dated Feb. 3, 2021 in corresponding U.S. Appl. No. 16/136,957, filed Sep. 20, 2018, 9 pages.

Office Action dated Jul. 30, 2021 in corresponding U.S. Appl. No. 16/136,957, filed Sep. 20, 2018, 12 pages.

Zhou et al., "Three-dimensional Printing for Catalytic Applications: Current Status and Perspectives," Jun. 12, 2017, Adv. Funct. Mater., 27, 1701134, 13 pages.

Thakkar et al., "3D-Printed Zeolite Monoliths for CO2 Removal from Enclosed Environments," Applied Materials & Interfaces, 2016, 8, 27753-27761, 9 pages.

* cited by examiner

3D PRINTED ZEOLITE MONOLITHS FOR $CO_2$ REMOVAL

RELATED APPLICATIONS

The present application is a divisional application of U.S. patent application Ser. No. 16/136,957, entitled 3D PRINTED ZEOLITE MONOLITHS FOR $CO_2$ REMOVAL, filed Sep. 20, 2018, and incorporated by reference herein. U.S. patent application Ser. No. 16/136,957 claims the priority benefit of U.S. Provisional Patent Application No. 62/560,740, entitled 3D PRINTED ZEOLITE MONOLITHS FOR $CO_2$ REMOVAL, filed Sep. 20, 2017, incorporated by reference herein.

STATEMENT REGARDING FEDERALLY SPONSORED RESEARCH OR DEVELOPMENT

This invention was made with Government support under Contract No. NNX15AK38A awarded by the National Aeronautics and Space Administration (NASA). The Government has certain rights in the invention.

FIELD

The present application is directed to compositions for the capture or removal of carbon dioxide ($CO_2$) from the air or from $CO_2$-containing gases or mixtures of gases. Specifically, the present disclosure is directed to zeolite monoliths configured to capture or remove $CO_2$, and methods of preparing and using such compositions.

BACKGROUND

In enclosed environments such as spacecraft or submarine cabins, $CO_2$ levels should be below 0.5% as long-term exposure to $CO_2$ concentrations greater than this level can cause severe health problems such as fatigue, listlessness, malaise, mood changes and headache. Therefore, removal of $CO_2$ from cabin atmosphere is a critical function of any spacecraft's or submarine's life support system. In addition, the removal of $CO_2$ from indoor air in commercial buildings is gaining significant attention among researchers primarily due to the health risks associated with elevated $CO_2$ concentration levels resulting from inadequate ventilation.

The removal of ultra-dilute $CO_2$, such as ppm $CO_2$ levels, from enclosed atmospheres is more challenging and energy-intensive than $CO_2$ capture from other industrial gas streams in which $CO_2$ concentration is typically above 5 vol. %. This is due to the low concentration-gradient driving force for adsorption at extremely dilute conditions. Moreover, additional considerations related to human health should be taken into account when developing technologies for $CO_2$ capture from enclosed environments. This is particularly important for spacecraft or space stations where attrition of the adsorbent particles or the release of toxic chemicals can pose serious health problems to astronauts.

Some current systems for cabin $CO_2$ removal utilize fixed beds of adsorbent pellets or beads. These adsorbents may be zeolite 13X or 5A molecular sieves which are commonly used as benchmark adsorbents for $CO_2$ capture from flue gas streams. As a result of high particle attrition rate, pressure drop builds up in the fixed bed which increases the blower power required to maintain flow, eventually requiring highly undesirable system maintenance. In such systems, dust fines generated from the attrition propagate downstream and can accelerate failure rates in downstream components. In order to reduce flow resistance through the fixed bed, pelletization of adsorbent particles with clay binder (or binderless pellets) may be required. Such pellets are highly porous structures allowing rapid mass transfer through the pellet. However, this open composite structure tends to have low resistance to attrition and may be weakened by humidity and/or large temperature excursions. Moreover, dusting due to particle attrition in enclosed environments can lead to human health problems such as pneumoconiosis.

Monolithic structures comprising adsorbent particles have been considered as an alternative to conventional packing systems like pellets, beads, or granules. Monolithic structures have been shown to improve the overall performance in terms of pressure drop and mass and heat transfer characteristics that eventually translate into a low-cost and more efficient capture technology while addressing the drawbacks of conventional packing systems. Monoliths are structured materials with parallel gas flow channels in which the shape and the diameter of the parallel channels and their density per cross sectional area of the monolith are controllable. Traditionally, monoliths are fabricated using an extrusion process. A particularly challenging aspect to shape adsorbents into monolithic contactors is the trade-off between key design parameters such as active adsorbent loading, mass and heat transfer properties, and cell density (cpsi). While higher adsorbent content per unit volume is desirable to achieve higher uptake, the kinetics of adsorption tends to become slower as a result of limited accessibility to adsorption sites in thicker walls. In addition, high cell density monoliths that maximize active adsorbent loading and surface area are preferred but pressure drop through the narrow channels is substantially higher than through low cell density monoliths. Monolithic adsorbents made of activated carbon, zeolites, and metal-organic frameworks (MOFs) have been considered as adsorbent structures for $CO_2$ capture. For example, cordierite monoliths washcoated with a thin layer of 13X zeolite have been investigated experimentally and numerically for $CO_2$ capture from flue gas. Although the mechanical strength of these coated substrates was found to be reasonably good, the ceramic support did not contribute to $CO_2$ adsorption, hence limiting the active adsorbent amount per unit volume. Therefore, more robust and highly efficient adsorbent structures are desired in order to improve $CO_2$ removal system efficiency and reliability.

BRIEF DESCRIPTION OF THE DRAWINGS

Embodiments of the present application are described, by way of example only, with reference to the attached Figures, wherein.

Figure 1:
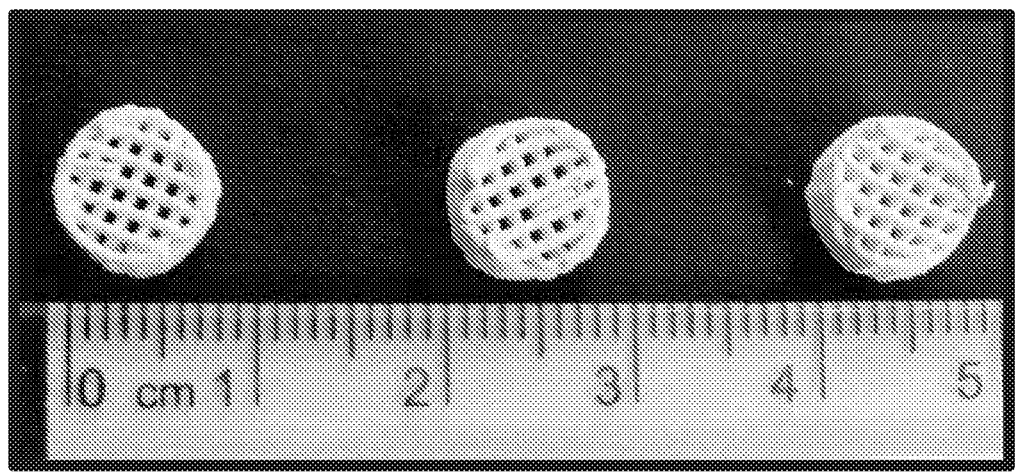
FIG. 1 illustrates self-standing cylindrical zeolite 13X monoliths having square channels and smooth surfaces fabricated by the presently disclosed 3D printing method, according to an example embodiment of the present disclosure.

It should be understood that the various aspects are not limited to the arrangements and instrumentality shown in the drawings.

DETAILED DESCRIPTION

It will be appreciated that numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The terms "comprising," "including" and "having" are used interchangeably in this disclosure. The terms "comprising," "including" and "having" mean to include, but are not necessarily limited to, the things so described.

The present disclosure provides 3D-printed zeolite monoliths and methods for their manufacture and use in $CO_2$ removal from air. 3D-printed zeolite monoliths exhibit excellent mechanical and adsorption properties that render them suitable candidates for not only $CO_2$ removal from enclosed environments but also for other adsorption and separation processes. Monoliths prepared using 3D printing techniques may have complex geometries with unique mechanical and structural properties. Notably, the use of 3D printing techniques allow for precisely fabricated three-dimensional devices having desired configurations and optimized properties, as opposed to monoliths prepared using conventional extrusion processes. High productivity and low fabrication cost are other noticeable advantages of these methods. By employing 3D printing techniques, it is possible to fabricate monoliths with various cross-sections, channel sizes, and wall thicknesses. More importantly, the fabrication parameters can be tuned to obtain parts with high mechanical properties.

According to at least one aspect of the present disclosure, a $CO_2$ capture material is provided. The $CO_2$ capture material may include one or more zeolite monoliths. In at least some instances, the zeolite monolith may consist of a 13X zeolite material or a 5A zeolite material and one or more binders. The zeolite monolith may be prepared layer by layer using a 3D printer. The zeolite monolith may comprise at least 80 wt % zeolite material, or at least 85 wt % zeolite material, or at least 90 wt % zeolite material. In at least some instances, the presently disclosed zeolite monoliths may comprise from about 80 wt % to about 90 wt % zeolite material. The one or more binders may be selected from the group consisting of bentonite clay, methyl cellulose, and any combination thereof. The one or more binders may comprise from about 7 wt % to about 15 wt % of the at least one zeolite monolith. The one or more binders may be a plasticizing organic binder. The plasticizing organic binder may comprise from about 2.0 wt % to about 3.5 wt % of the zeolite monolith. In at least some instances, the plasticizing organic binder may be methyl cellulose. In some instances, the one or more binders may comprise from about 7 wt % and about 15 wt % bentonite clay and from about 2.0 wt % and about 3.5 wt % methyl cellulose. In at least some instances, the zeolite monolith may further include a co-binder. In some cases, the co-binder may be polyvinyl alcohol. In some instances, the co-binder may comprise from about 1.0 wt % to about 1.5 wt % of the zeolite monolith.

According to at least one aspect of the present disclosure, the zeolite monolith may exhibit a mesopore volume of at least about 0.009 cm$^3$/g, or of at least about 0.012 cm$^3$/g. In at least some instances, the zeolite monolith may have a mesoporosity of from about 0.009 cm$^3$/g to about 0.020 cm$^3$/g, or from about 0.009 cm$^3$/g to about 0.012 cm$^3$/g, or from about 0.012 cm$^3$/g to about 0.020 cm$^3$/g. In at least some instances, the zeolite monolith may have a microporosity of from about 0.22 cm$^3$/g to about 0.26 cm$^3$/g, or from about 0.18 cm$^3$/g to about 0.26 cm$^3$/g, or from about 0.15 cm$^3$/g to about 0.30 cm$^3$/g. In some cases, the zeolite monolith comprises a wall thickness of from about 0.4 mm to about 0.8 mm. In at least some instances, the zeolite monolith comprises a channel width of from about 0.2 mm to about 0.6 mm. The presently disclosed zeolite monoliths may exhibit a compression strength of from about 0.30 MPa to about 0.69 MPa or from about 0.05 MPa to about 0.35 MPa. The presently disclosed zeolite monoliths may also exhibit a Young's modulus of from about 7.50 MPa to about 15.0 Mpa, for 13X zeolite monoliths, or from about 1.65 MPa to about 9.45 Mpa for 5A zeolite monoliths.

In at least some instances, the presently disclosed $CO_2$ capture material may include a plurality of zeolite monoliths. The presently disclosed $CO_2$ capture material and zeolite monoliths are effective at capturing $CO_2$ from a gas or mixture of gases comprising about 5% or less $CO_2$.

According to at least one aspect of the present disclosure, a device for removing $CO_2$ from a gas or mixture of gases in an enclosed compartment is provided. The device may include a filter comprising the presently disclosed $CO_2$ capture material and a means for causing a gas or mixture of gases to contact the filter comprising the $CO_2$ capture material.

According to at least one aspect of the present disclosure, a method of preparing a 3D-printed zeolite monolith is provided. The method may include mixing zeolite powder, bentonite clay, a plasticizing organic binder, and a co-binder using a high-performance dispersing instrument at 2500 rpm to obtain a powder mixture. The method may further include adding a sufficient amount of distilled water to the powder mixture and mixing using the high-performance dispersing instrument at 2500 rpm to form an aqueous paste. The method may further include depositing the aqueous paste layer-by-layer, using a 3D-printing apparatus, onto a substrate to produce a 3D-printed zeolite monolith. The zeolite powder may be selected from the group consisting of a 13X zeolite powder and a 5A zeolite powder. The inorganic binder may be bentonite clay. In at least some instances, the plasticizing organic binder may be methyl cellulose. In some cases, the co-binder may be polyvinyl alcohol.

According to at least one aspect of the present disclosure, a method for removing $CO_2$ from a gas or mixture of gases comprising 5% or less $CO_2$ is provided. The method may include bringing a gas or mixture of gases comprising carbon dioxide in contact with the presently disclosed $CO_2$ capture material and capturing at least a portion of the $CO_2$ in the gas or mixture of gases in the $CO_2$ capture material. In some instances the $CO_2$ is removed from a gas or mixture of gases in an enclosed compartment. For example, the enclosed compartment may include a submarine compartment, a spacecraft compartment, a building, or a dwelling.

Preparation of Zeolite Monoliths

Self-standing zeolite monoliths may be prepared from zeolite 13X and 5A powders (UOP), bentonite clay (Sigma Aldrich) as a binder, methyl cellulose (Thermo Fisher), as a plasticizing organic binder, and poly(vinyl) alcohol (PVA, Sigma-Aldrich) as a co-binder. Methyl cellulose contains hydroxyl groups that contribute to additional particles cohesion while playing an important role in the monolith strength. A desired amount of these powders may be first mixed using a high-performance dispersing instrument IKA-R25 at 2500 rpm. After obtaining a homogeneous powder mixture, a sufficient amount of distilled water may be added and mixed rigorously using the IKA-R25 at 2500 rpm until a homogenous aqueous paste with suitable viscosity is produced. The paste is loaded into a syringe (3 mL, Norson EFD, USA) attached to a nozzle with a 0.60 mm diameter. In the next step, the paste is extruded through the moving nozzle in a Robocasting 3D printer (3D Inks, Stillwater, Okla., USA). In this method, the printed product is first designed by the software RoboCAD 4.2 that controls the printer motion and then the paste is deposited in a layer by layer fashion with layers being perpendicular to each other. Well-defined structures with uniform channel and layer thickness may be obtained by this method.

FIG. 1 illustrates self-standing cylindrical zeolite 13X monoliths having square channels and smooth surfaces fabricated by the presently disclosed 3D printing method. After the monolithic structures are printed, they may be initially dried at room temperature to partially remove water content. The pieces may then be placed into an oven and heated at 100° C. to remove the rest of water and allow the polymer linker (PVA) and methyl cellulose to quickly build up high strength and avoid skin cracking. After drying in the oven, the monoliths may be calcined (sintered) at 700° C. at the rate of 20° C./min in a temperature-controlled furnace for 2-4 hours in order to decompose and remove the co-binders, methyl cellulose and PVA. This calcination step removes the organic content and results in increasing the mesoporosity in addition to enhancing the mechanical strength of the final calcined monolith.

In order to determine the mechanical stability and $CO_2$ adsorption performance of monolithic structures, zeolite 13X and 5A monoliths were prepared by varying the zeolite to binder weight ratio, co-binder and plasticizer concentrations. Table 1 shows the compositions of the 3D-printed 13X and 5A monoliths prepared according to the presently disclosed method.

TABLE 1

Compositions of the fabricated 3D-printed 13X and 5A zeolite monoliths.

| Monolith | Zeolite (wt %) | Bentonite clay (wt %) | Methyl cellulose (wt %) | PVA (wt %) |
| --- | --- | --- | --- | --- |
| R2 | 80 | 15 | 3.5 | 1.5 |
| R3 | 85 | 10 | 3.5 | 1.5 |
| R4 | 90 | 7 | 2.0 | 1.0 |

Characterization of Zeolite Monoliths

The textural properties of the zeolites in both powder and monolith forms were determined by collecting $N_2$ physisorption isotherms at 77 K using a Micromeritics 3Flex gas analyzer. All samples were first degassed on a Micromeritics PreVac at 350° C. for 8 hours before measurement. The obtained isotherms were used to evaluate the surface area pore volumes, and pore size distribution (PSD). The X-ray diffraction (XRD) measurements were conducted using PANalytical X'Pert Multipurpose X-ray Diffractometer with scan step size of 0.02°/step at the rate of 147.4 s/step. Structural morphology was studied by Hitachi 54700 Field Emission Scanning Electron Microscopy (SEM). In order to obtain cross sectional view in SEM, monolith structures were placed horizontally on the sampler holder and their height was adjusted accordingly. To measure the residual binder content that remains in the monolith after calcination, TGA-DSC was carried out from 25 to 700° C. at the rate of 20° C./minute using TGA (Q500, TA Instruments).

Mechanical Testing

Mechanical testing was carried out using an Instron 3369 (Instron, Norwood, USA) mechanical testing device. Initially, monoliths were polished with a 3M surface smoothing sand paper to prevent uncertain surface and to avoid cracks on the surface for achieving effective results. After polishing, the monolith was placed between two metal plates and compressed with 500 N load cell at 2.5 mm/minute while the applied load and piston movement was recorded, following the ASTM D4179-01 (standard test method for single pellet crush strength of formed catalyst shapes) procedure. The compressive force was applied until the monolith broke.

Adsorption Capacity Measurements

TGA (Q500, TA Instruments) was utilized to measure $CO_2$ capacity under ultra-dilute capture conditions. To drive off the pre-adsorbed gases, moisture or any other impurities, commercial powders and synthesized monoliths were first degassed at 400° C. under $N_2$ with the flow rate of 40 mL/minute. $CO_2$ capture uptake measurements were then carried out at room temperature by exposing the samples to 0.5% $CO_2$ in $N_2$. In addition, the $CO_2$ and $N_2$ adsorption isotherms for R4 monoliths and their powder counterparts were measured by 3Flex at 25° C.

$CO_2$ Breakthrough Experiments

Breakthrough experiments were performed in a small-scale fixed-bed column coupled with a BEL-Mass spectrometer (MS). The feed stream with a composition of 0.5% $CO_2/N_2$ was fed into the column at a flow rate of 60 mL/min. Prior to each sorption experiment, the bed was heated to 400° C. under flowing $N_2$ at 60 mL/min for 2 hours to desorb adventitious $CO_2$ and water, then cooled to 25° C. and exposed to $CO_2$ for the experimental sorption run. The effluent composition exiting the column was transiently measured by the MS and after reaching the inlet concentration, the desorption step was started by flowing $N_2$ to the column at the same flowrate (i.e., 60 mL/min).

Physical Properties of 3D-Printed Monoliths

Figure 2A:
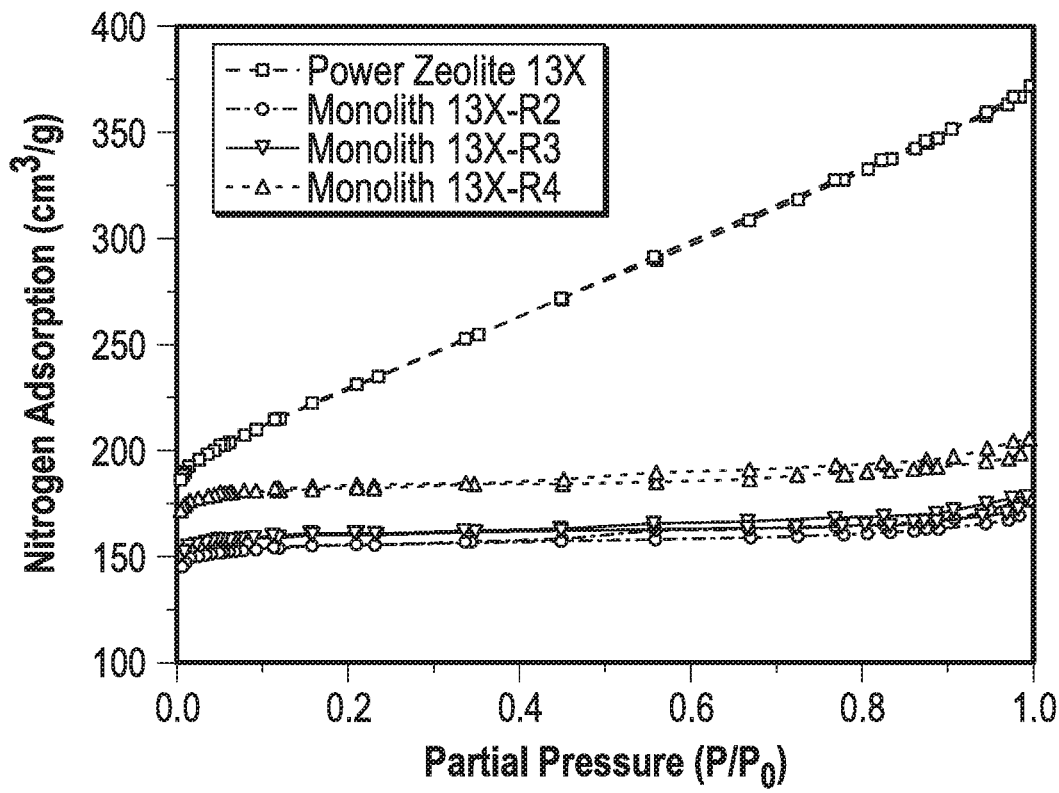
FIG. 2A shows $N_2$ physisorption isotherms for 13X zeolite monoliths prepared using the presently disclosed method, according to an example embodiment of the present disclosure.
Figure 2B:
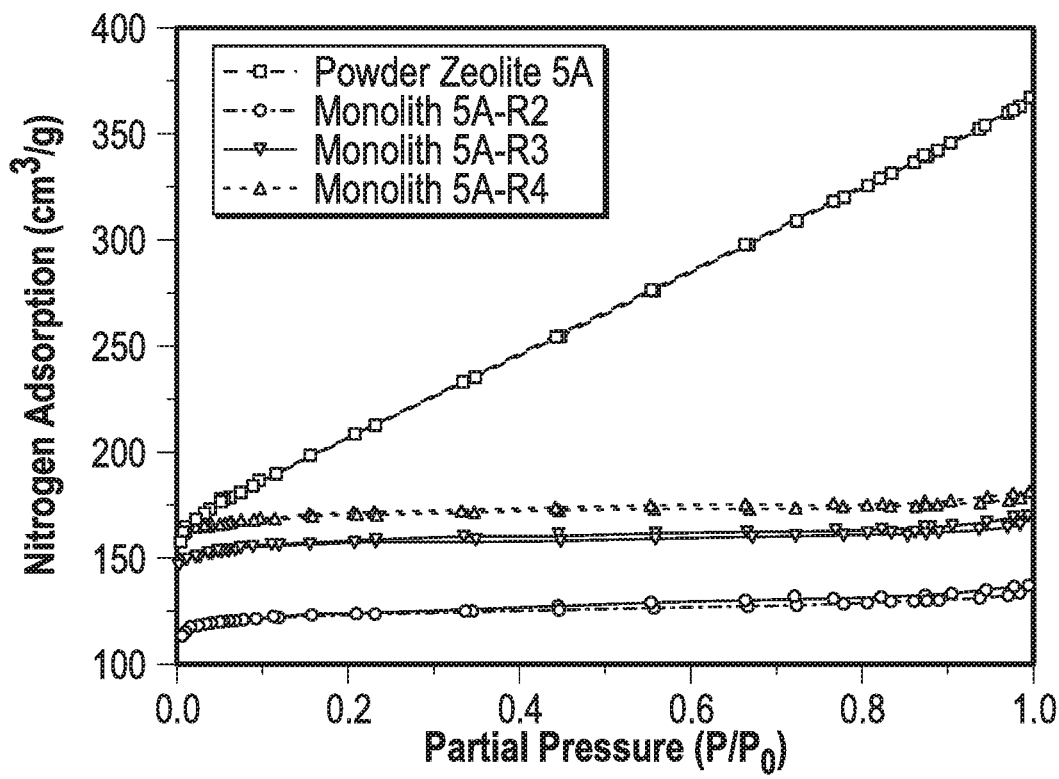
FIG. 2B illustrates $N_2$ physisorption isotherms for 5A zeolite monoliths prepared using the presently disclosed method, according to an example embodiment of the present disclosure.
Figure 2C:
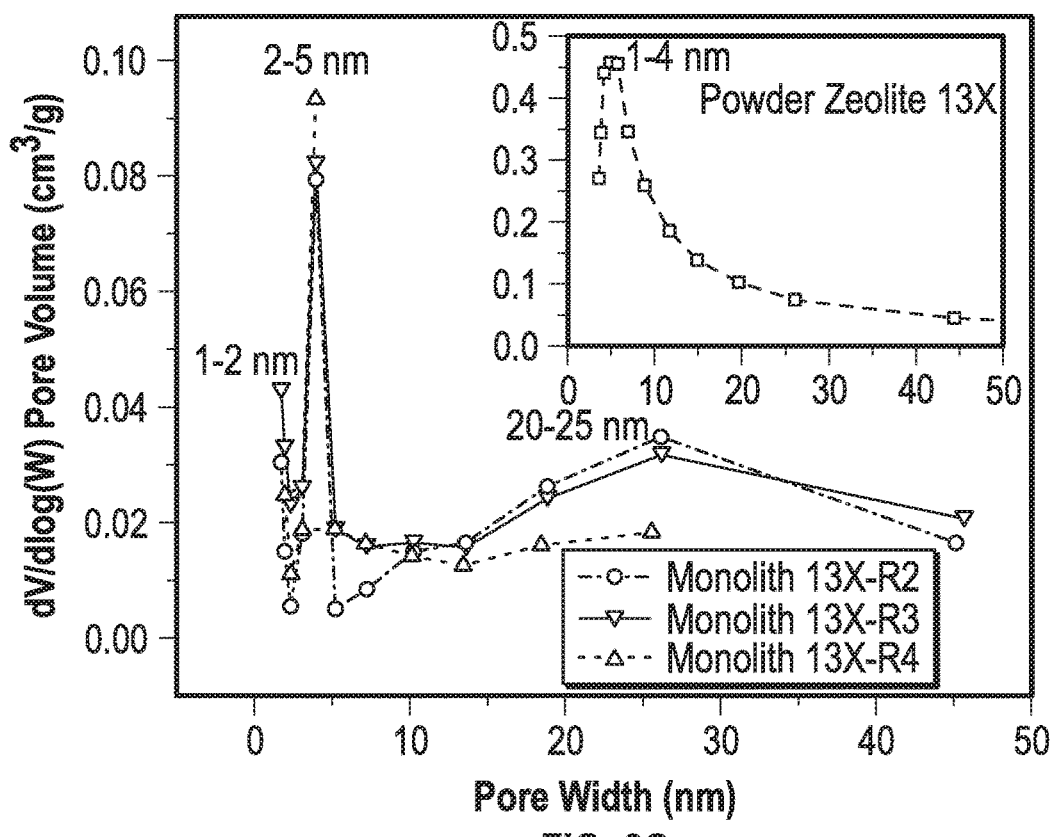
FIG. 2C shows pore size distribution curves for 13X zeolite monoliths prepared using the presently disclosed method, according to an example embodiment of the present disclosure.
Figure 2D:
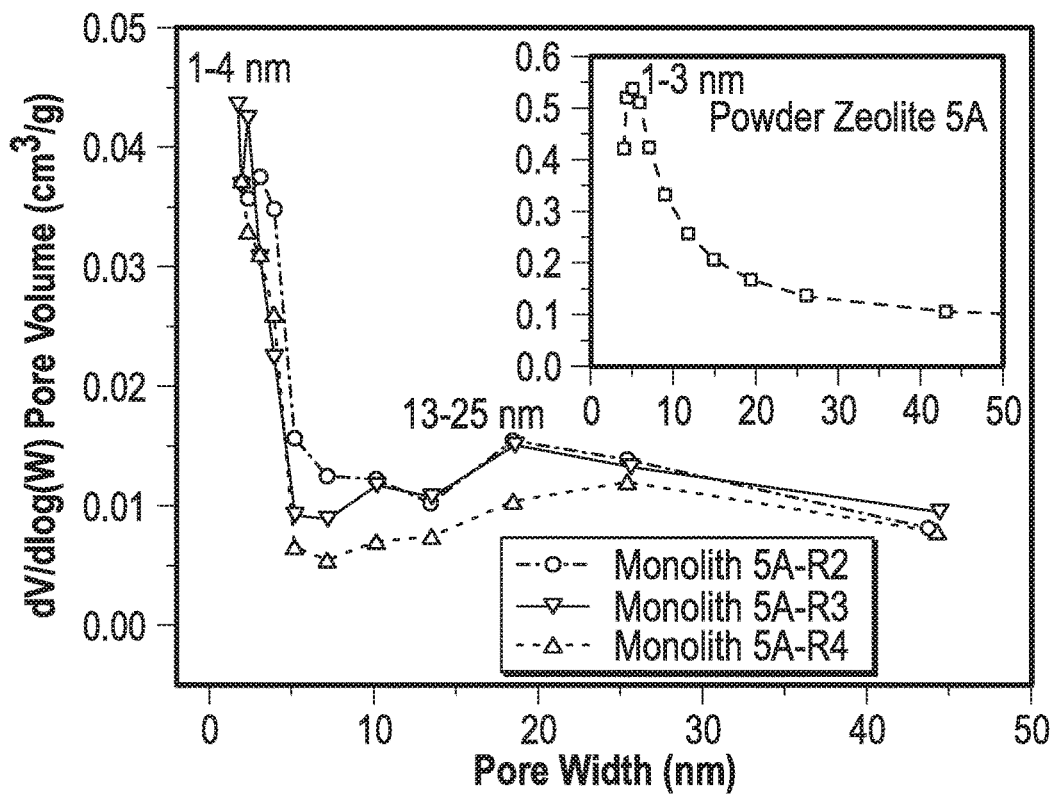
FIG. 2D illustrates pore size distribution curves for 5A zeolite monoliths prepared using the presently disclosed method, according to an example embodiment of the present disclosure.

FIG. 2A-D illustrates $N_2$ physisorption isotherms and the corresponding pore size distribution curves, for the presently disclosed 13X and 5A zeolite monoliths. FIG. 2A shows $N_2$ physisorption isotherms for 13X zeolite monoliths prepared according to the presently disclosed methods. FIG. 2B illustrates $N_2$ physisorption isotherms for 5A zeolite monoliths prepared according to the presently disclosed methods. FIG. 2C shows pore size distribution curves for 13X zeolite monoliths prepared according to the presently disclosed methods, while FIG. 2D illustrates pore size distribution curves for 5A zeolite monoliths prepared according to the presently disclosed methods. The pore size distribution was derived from the DFT method using the desorption branch of the $N_2$ isotherm.

The $N_2$ physisorption isotherms and the corresponding pore size distribution curves, shown in FIG. 2A-D, were used to assess the porosity of the monoliths and their powder analogues. For the monolithic samples, the isotherms show an initial steep uptake at low partial pressures ($P/P_0$) between 0.0 and 0.05 corresponding to the adsorption in the micropores, followed by a gradual increase with hysteresis at high $P/P_0$ indicative of capillary condensation in mesopores. The $N_2$ isotherms for 3D-printed 13X and 5A monoliths are of type IV isotherm shape while the powder zeolites displayed a typical type I isotherm shape characteristic of microporous materials.

Table 2 summarizes the BET surface area, micropore and mesopore volumes, and the corresponding diameters of 3D-printed monoliths prepared according to the present disclosure, as well as zeolite powders. The BET surface areas of 13X-R4 and 5A-R4 monoliths were found to be 635 and 543 m²/g, respectively whereas the micropore volumes (at $P/P_0$=0.99) were calculated to be 0.24 and 0.25 cm³/g, respectively. As shown in Table 2, all of these BET values were relatively lower than those for zeolite 13X and 5A in the powder form, as expected due to the lower zeolite content. The data presented in Table 2 also shows that the characteristics of the 13X and 5A monoliths were very similar. Although increasing the binder content resulted in reduced BET surface area and micropore volume, the mesopore volume increased with binder content. Notably, the mesopore volume of 13X monolith was higher than that of the 5A monoliths with similar composition (0.020 compared to 0.014 cm³/g). It should be noted here that for the rest of our analysis we only focused on the monoliths with highest zeolite loading (R4) and compared their characteristics with their powder counterparts.

TABLE 2

$N_2$ physisorption data for 3D-printed monoliths and zeolite powders.

| Sample | $S_{BET}$[a] (m²/g) | $V_{micro}$[b] (cm³/g) | $V_{meso}$[c] (cm³/g) | $d_{micro}$[d] (nm) | $d_{meso}$[d] (nm) |
|---|---|---|---|---|---|
| Powder zeolite 13X | 770 | 0.31 | — | 1.06 | — |
| Monolith 13X-R2 | 498 | 0.22 | 0.020 | 1.06 | 2.5, 4, 6.3, 7.8 |
| Monolith 13X-R3 | 517 | 0.25 | 0.018 | 1.06 | 2.8, 3, 3.6, 4.2, 6.8 |
| Monolith 13X-R4 | 571 | 0.26 | 0.012 | 1.06 | 4.3 |
| Powder zeolite 5A | 705 | 0.29 | — | 1.07 | — |
| Monolith 5A-R2 | 395 | 0.18 | 0.014 | 1.07 | 2.6, 3.2, 3.8, 4, 6.7 |
| Monolith 5A-R3 | 504 | 0.23 | 0.012 | 1.07 | 2.8, 3.6 |
| Monolith 5A-R4 | 543 | 0.25 | 0.009 | 1.07 | 2.5, 3.2 |

[a]Obtained at $P/P_0$ in the range of 0.05-0.3.
[b]Estimated by t-plot.
[c]Estimated by subtracting Vmicro from the total volume at $P/P_0$ = 0.99.
[d]Estimated using Horvath-Kawazoe method.

As shown in Table 2, the size of the micropores calculated using the DFT method was 1.06 nm for 13X-R4 and 1.07 nm for 5A-R4 monoliths. For all materials, the first peak appears in the range from 0.5 to 2 nm which corresponds to micropore range. For 13X-R2 and 13X-R3 zeolite monoliths, the meso-sized pores were obtained in the range of from about 20 nm to 25 nm. This difference in the mesopore size distribution may be attributed to short heating and stirring time. As expected, shaping zeolite particles into a self-standing monolith configuration using 3D printing method introduces mesoporosity into the structure. In addition, the formed mesopores in the monolith R2 monoliths are bigger in size than in the R3 and R4 monoliths mainly due to the smaller amounts of binder and plasticizer in the later samples.

After forming a paste, the function of the plasticizer is no longer necessary and to achieve better mass transfer and the formation of secondary pore structure, removal of plasticizer is processed by calcination. Upon calcination, the organic content of the monolith (i.e., methyl cellulose and PVA) was removed rendering the calcined monoliths containing zeolite and binder particles only. To verify this, the amounts of zeolite and bentonite clay were quantified by TGA.

Figure 3A:
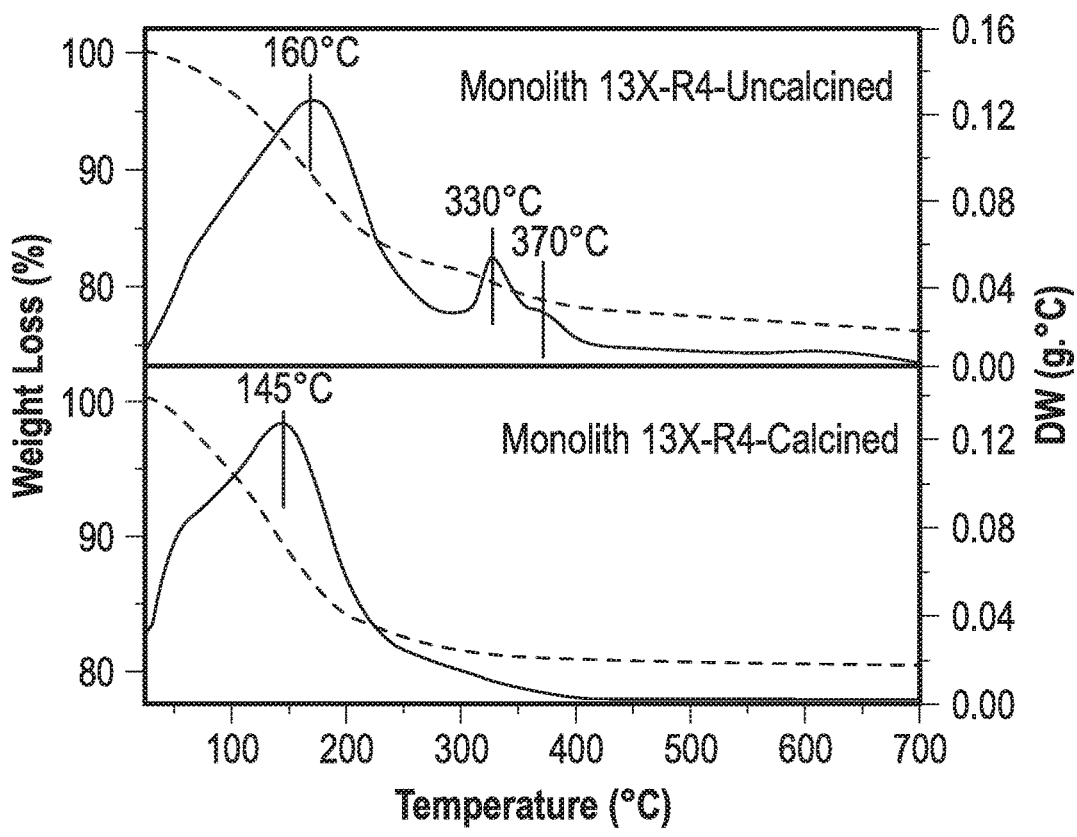
FIG. 3A shows thermogravimetry curves and differential thermogravimetry curves for calcined and uncalcined R4 13X monoliths, according to an example embodiment of the present disclosure.
Figure 3B:
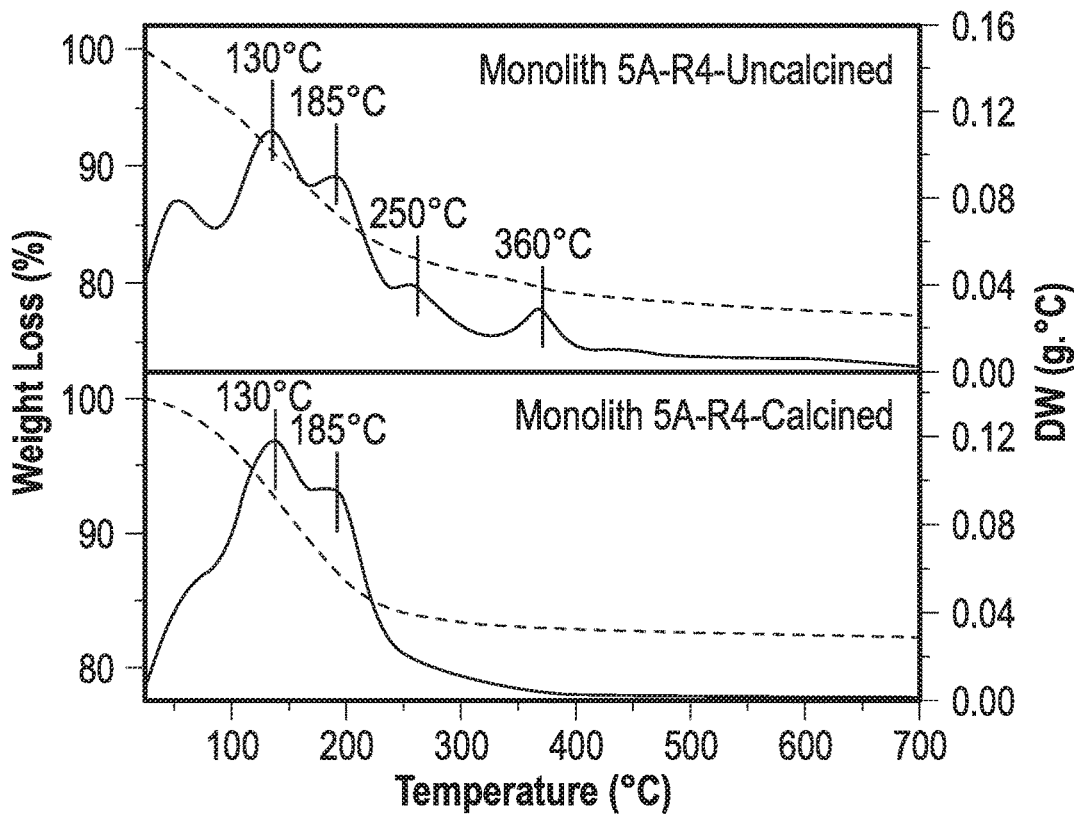
FIG. 3B illustrates thermogravimetry curves and differential thermogravimetry curves for calcined and uncalcined R4 5A monoliths, according to an example embodiment of the present disclosure.
Figure 10A:
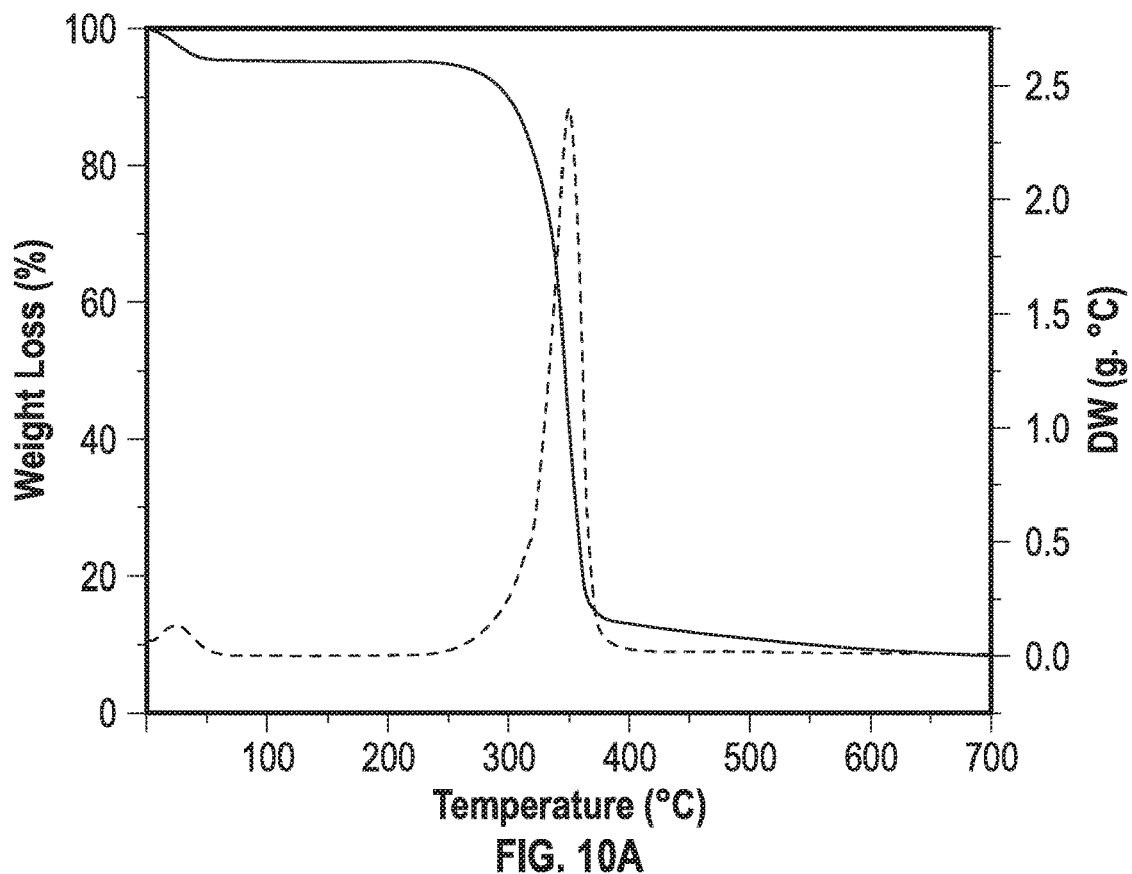
FIG. 10A illustrates thermogravimetry and differential thermogravimetry curves for methyl cellulose, according to an example embodiment of the present disclosure.
Figure 10B:
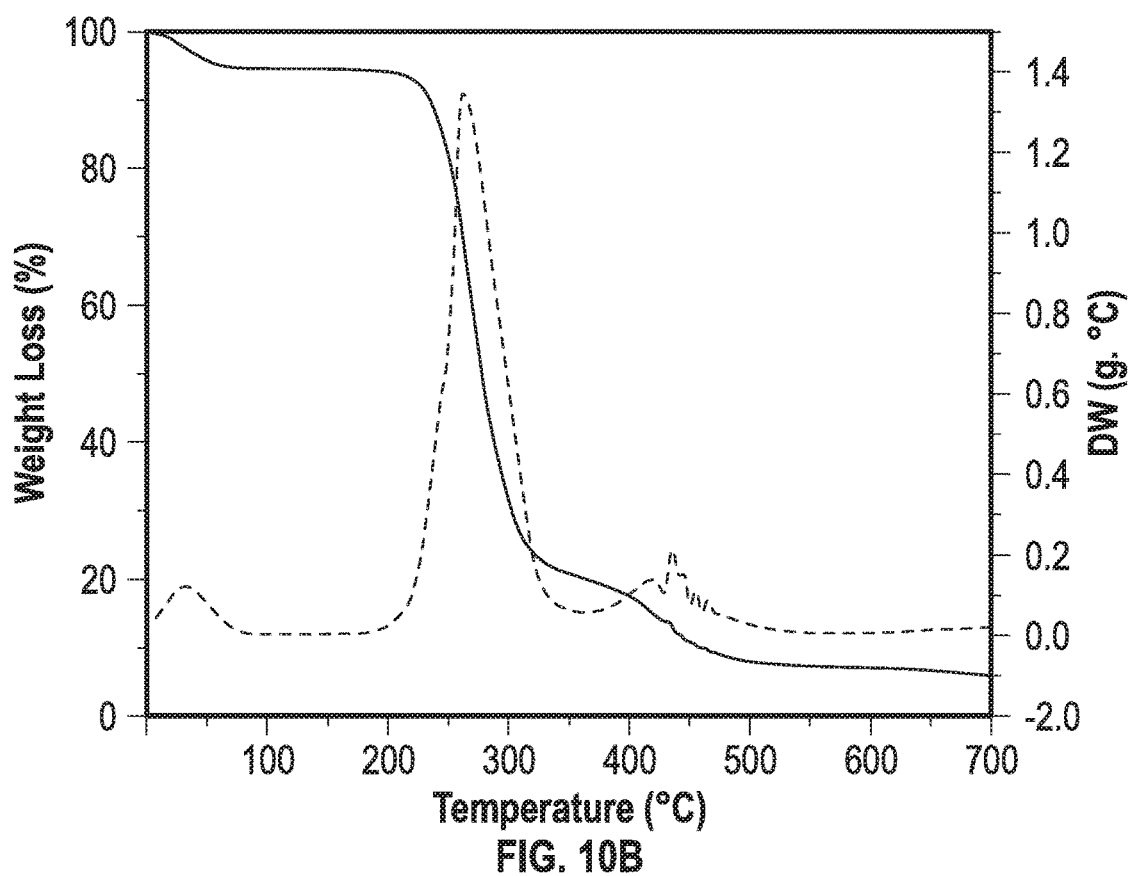
FIG. 10B illustrates thermogravimetry and differential thermogravimetry curves for PVA, according to an example embodiment of the present disclosure.

FIGS. 3A-B illustrates thermogravimetry curves and differential thermogravimetry curves for as-synthesized (uncalcined) and calcined zeolite monoliths for the highly loaded R4 sample. Specifically, FIG. 3A shows the thermogravimetry curves and differential thermogravimetry curves for calcined and uncalcined R4 13X monoliths while FIG. 3B illustrates thermogravimetry curves and differential thermogravimetry curves for calcined and uncalcined R4 5A monoliths. As shown in FIG. 10, TGA data of methyl cellulose and PVA indicated a weight loss step at 360° C. and 275° C., respectively. On the basis of these profiles, it is believed that the weight losses below 200° C. correspond to moisture desorption. For uncalcined monoliths, the other weight losses appearing between 200° C. and 700° C. are associated with the decomposition of organic additives, whereas for calcined samples, small weigh losses could be attributed to the loss of organic compounds that had been trapped in the pore network during the sintering process and still existed in the structure after calcination. The total weight loss between 200° C. and 700° C. was 10 wt % and 8 wt % for uncalcined 13X-R4 and 5A-R4 calcined monoliths, respectively, while both samples exhibited ~4 wt % weight loss after calcination. The later implies that the total weight of zeolite and permanent binder (bentonite clay) in the final monoliths is ~96 wt % which is close to the nominal weight fractions used in the preparation step (see Table 1).

Structural Properties of 3D-Printed Monoliths

Figure 4A:
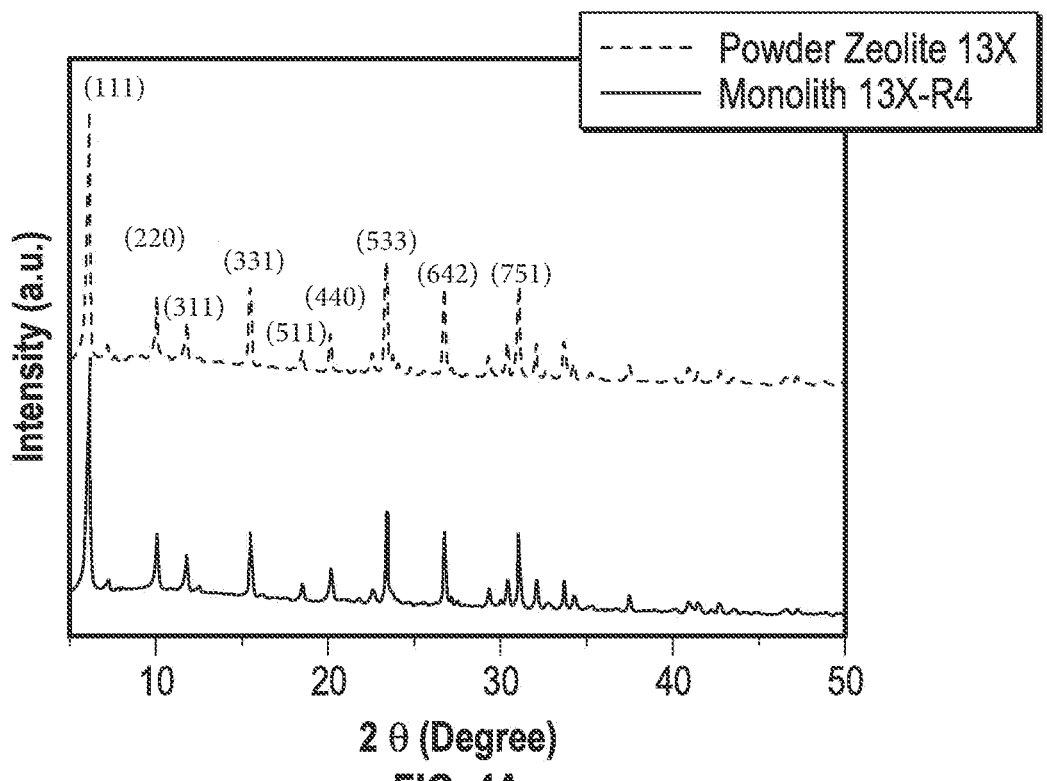
FIG. 4A illustrates the XRD patterns of calcined monolith 13X-R4 and 13X powdered zeolite, according to an example embodiment of the present disclosure.
Figure 4B:
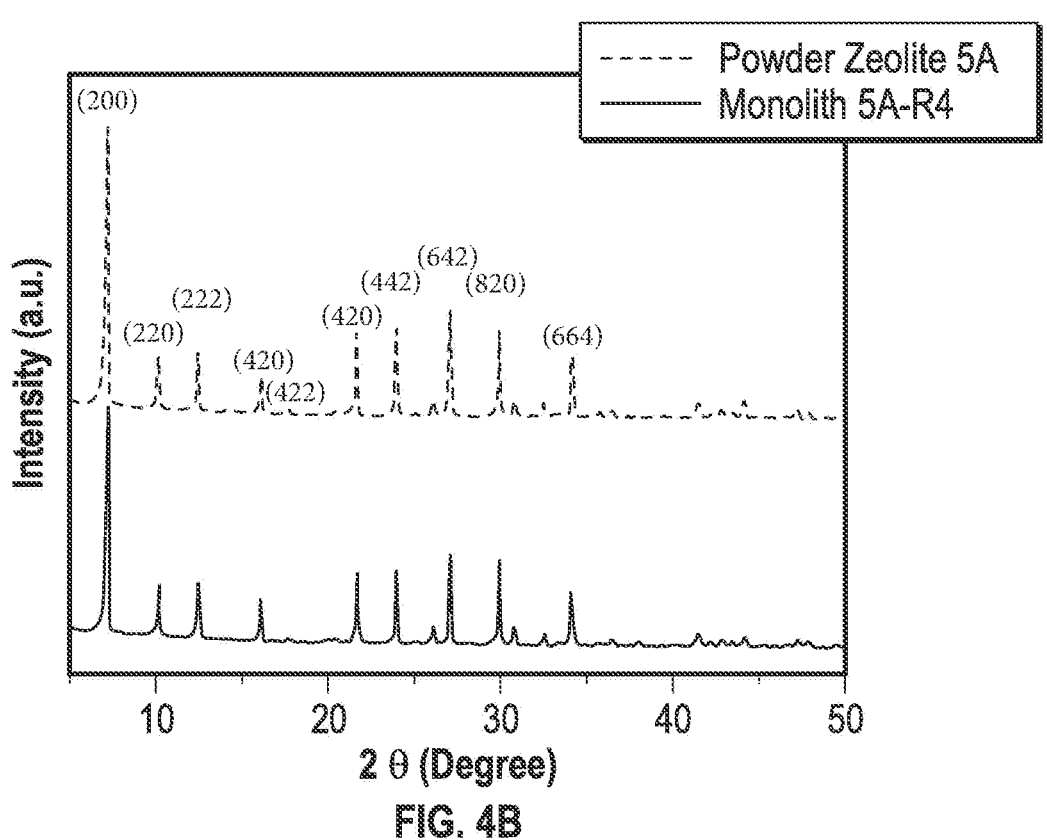
FIG. 4B illustrates the XRD patterns of calcined monolith 5A-R4 and 5A powdered zeolite, according to an example embodiment of the present disclosure.
Figure 5A:
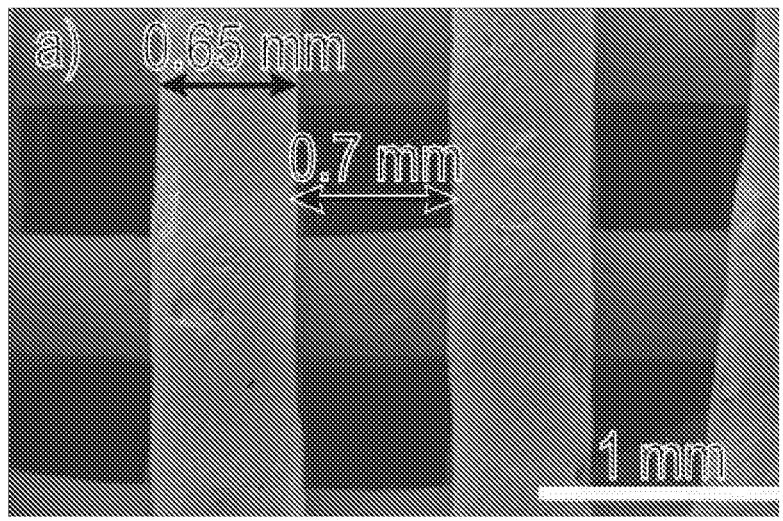
FIGS. 5A-D show SEM images of the R4 sample of the 13X zeolite monolith with increasing magnification, according to an example embodiment of the present disclosure.
Figure 5B:
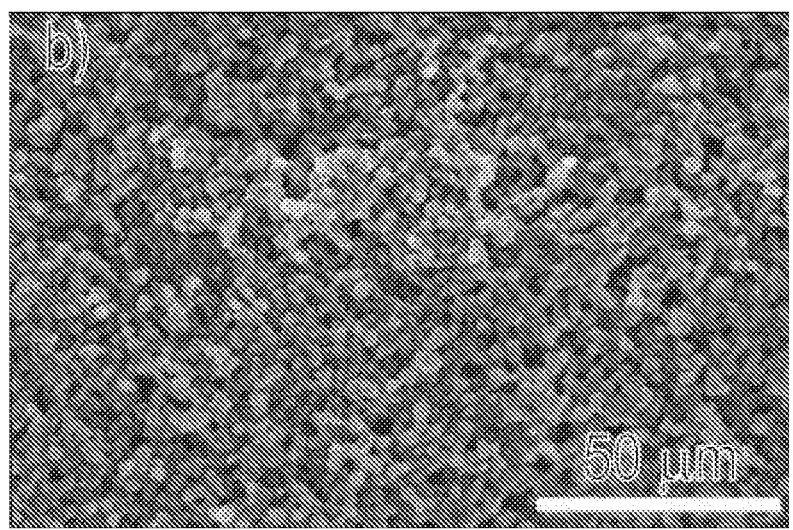
Figure 5C:
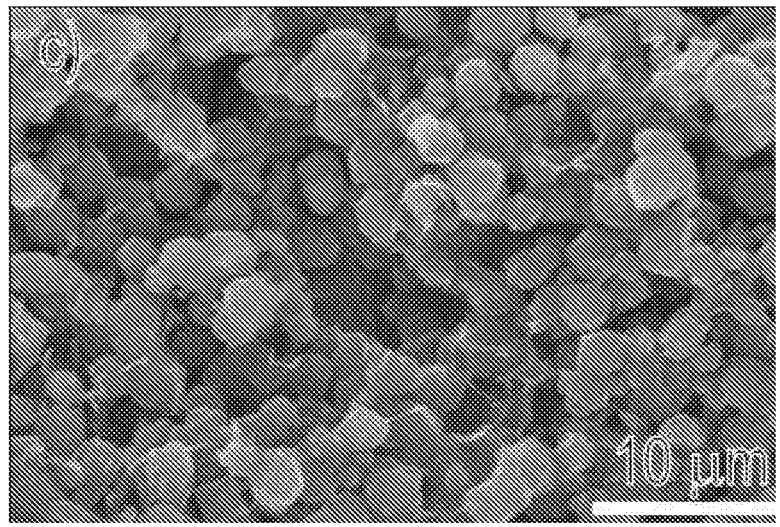
Figure 5D:
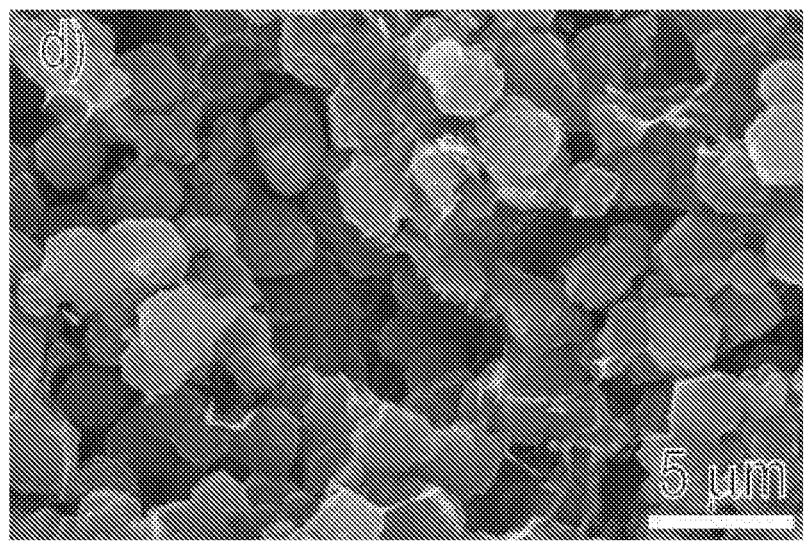
Figure 5E:
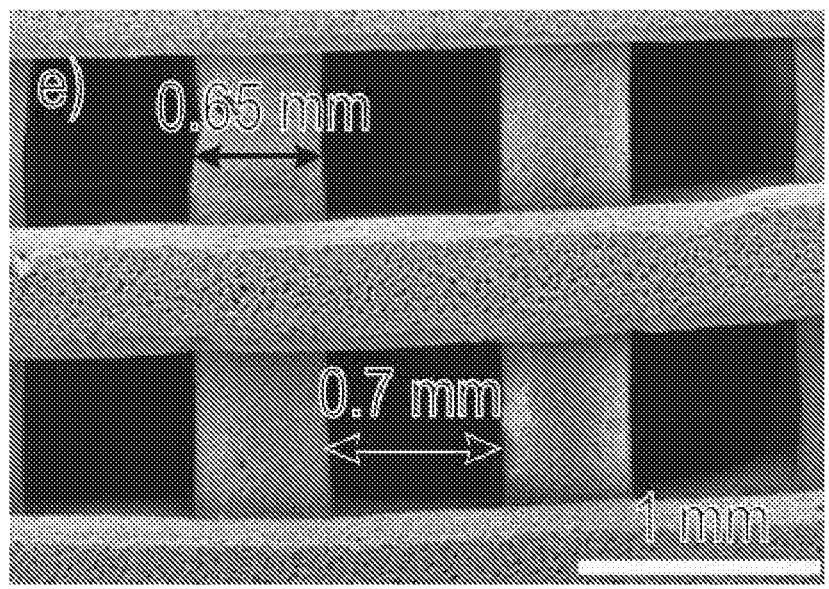
FIGS. 5E-H show SEM images of the R4 sample of the 5A zeolite monolith with increasing magnification, according to an example embodiment of the present disclosure.
Figure 5F:
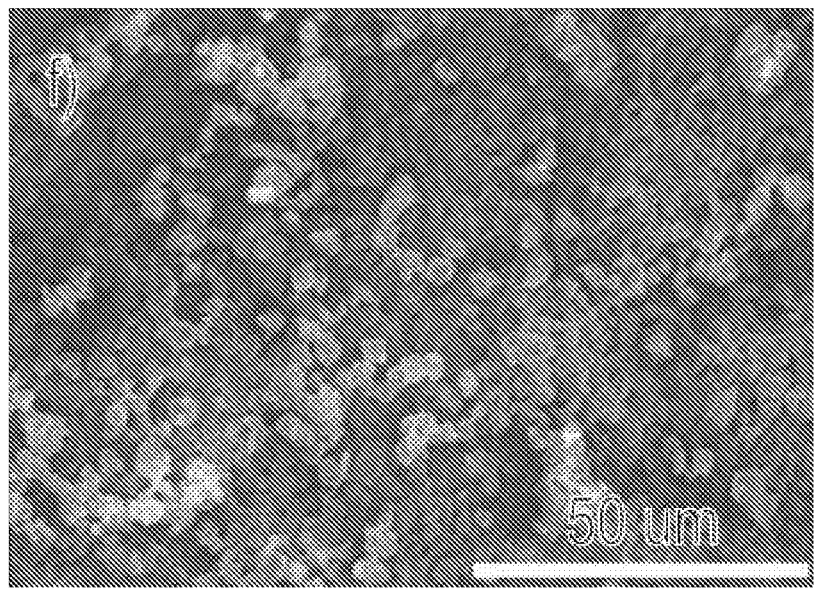
Figure 5G:
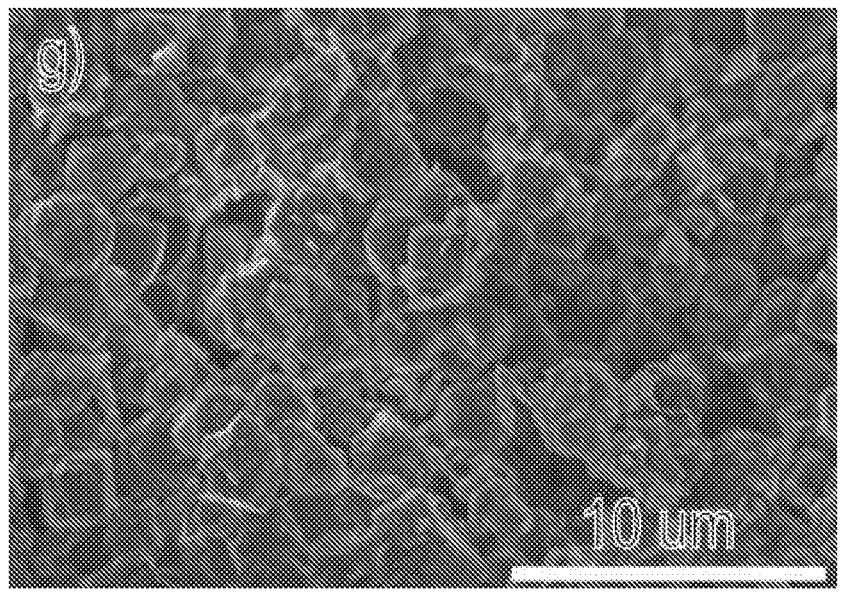
Figure 5H:
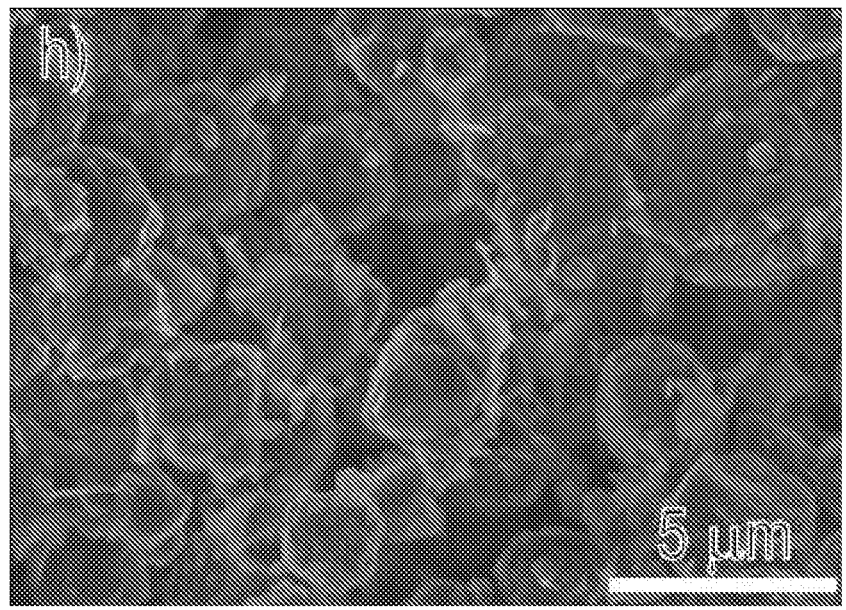
Figure 11:
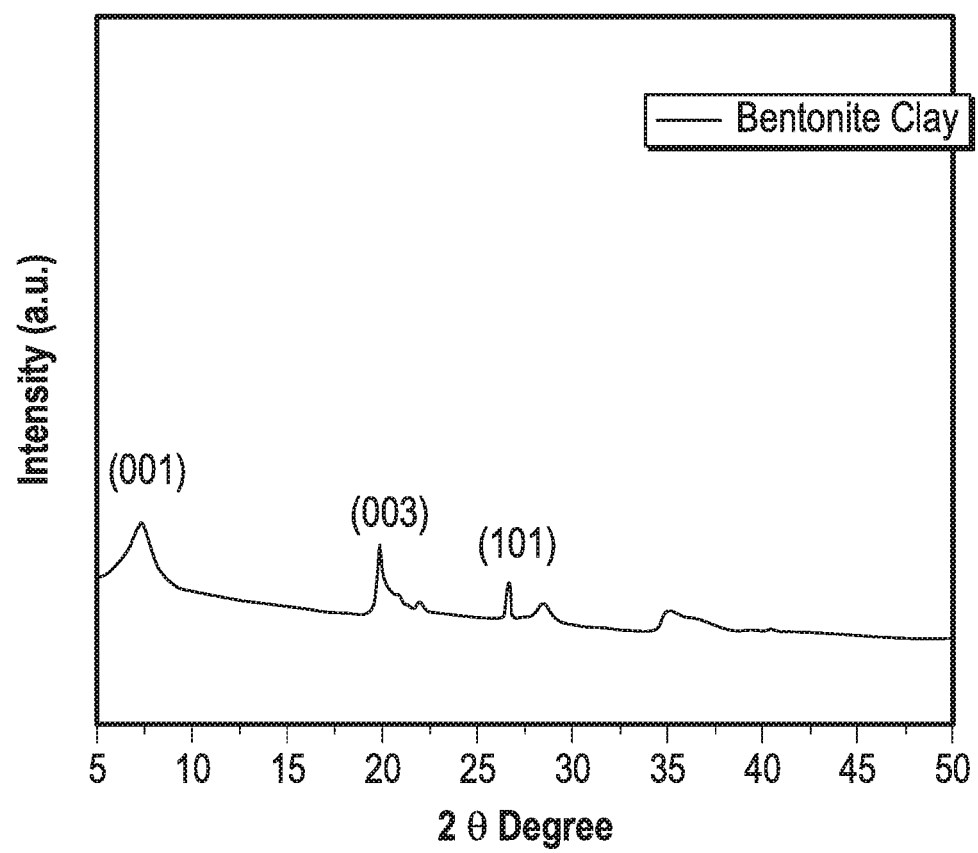
FIG. 11 illustrates the X-ray diffraction (XRD) pattern for bentonite clay, according to an example embodiment of the present disclosure.

FIGS. 4A-B illustrates the XRD patterns of 13X-R4 and 5A-R4 zeolite monoliths after calcination along with their powder counterparts. Specifically, FIG. 4A shows the XRD patterns of calcined monolith 13X-R4 and 13X powdered zeolite, while FIG. 4B illustrates the XRD patterns of calcined monolith 5A-R4 and 5A powdered zeolite. As depicted in FIGS. 4A-B, good crystallinity of the zeolites was retained although slight differences in the peak intensities can be observed in the XRD patterns of 3D-printed monoliths with 90 wt % zeolite loading. This could be attributed to the presence of the binder (bentonite clay) or the change in the size of zeolite particles as a result of sintering during the calcination process. In addition, these patterns reveal that the diffraction peaks of FAU and LTA frameworks were retained in the monolithic structures. The presence of peaks at 2=6.2°, 15.6°, and 30.9° in FIG. 4A correspond to (111), (331), and (715) planes in FAU framework, respectively whereas the reflections at 2=7.2°, 16.1°, and 27.1° in FIG. 4B are related to (200), (420), and (642) planes in LTA framework. It is worth mentioning that the low intensity diffractions peaks of bentonite clay, as shown in FIG. 11, appeared at 2~20 and 27° and were overlapped with those of zeolites at the same angle.

Low and high magnification scanning electron microscope (SEM) images of 13X-R4 and 5A-R4 monoliths prepared according to the presently disclosed 3D printing technique are presented in FIGS. 5A-H. Specifically, FIGS. 5A-D show SEM images of the R4 sample of the 13X zeolite monolith with increasing magnification, while FIGS. 5E-H show SEM images of the R4 sample of the 5A zeolite monolith with increasing magnification. The low magnification SEM images shown in FIG. 5A and FIG. 5E reveal the uniform square channel cross-section of the structures with a wall thickness of ~0.65 mm and channel width of ~0.4 mm for both the 13X and 5A zeolite monoliths. The magnified views of the channel structures shown in FIGS. 5B-D and FIGS. 5F-H clearly illustrate the macroporous nature of the walls with pores on the order of 5-50 μm. These images indicate that the 3D-printed monoliths retained their porous morphology and that the particles sintered together to form a porous network with voids having sizes on the scale of micrometers. Moreover, it is apparent from these images that the particle distribution was not adversely affected by the paste preparation and printing conditions, and no particles agglomeration could be observed.

Mechanical Strength of 3D-Printed Monoliths

Figure 6:
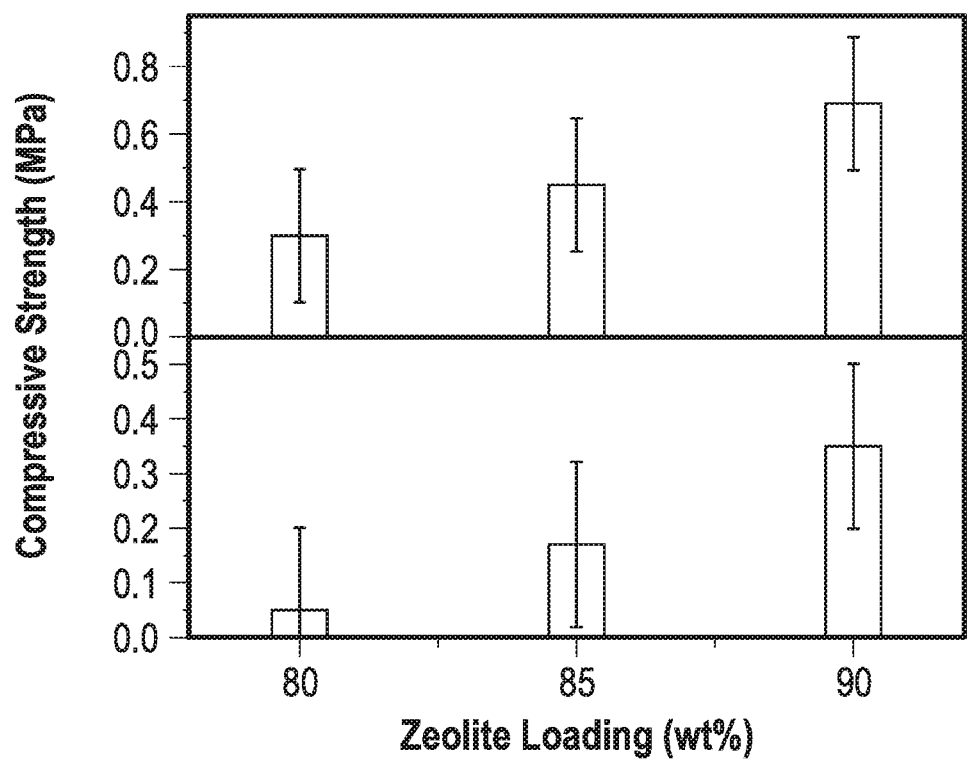
FIG. 6 illustrates the compressive strength of monoliths as a function of zeolite loading (wt %) for (top) 13X zeolite monolith and (bottom) 5A 3D-printed monoliths, according to an example embodiment of the present disclosure.

The mechanical strength and deformation of the samples were assessed by a compression test. FIG. 6 illustrates the compressive strength of monoliths as a function of zeolite loading (wt %) for (FIG. 6 top) 13X zeolite monolith and (FIG. 6 bottom) 5A 3D-printed monoliths. In addition, the corresponding compressive strength and the average Young's modulus values extracted from this data are presented in Table 3. The trend in FIG. 6 (top) suggests a proportional relationship between zeolite loading and compressive strength and also the displacement between particles that the material tends to retain upon loading, relative to the length of the monolith. The 13X-R4 sample, containing the highest zeolite loading (90 wt %), showed maximum compressive strength (0.69 MPa) before catastrophic failure which can be attributed to its porosity and microporous texture. Since a smaller amount of binder and additives were used in the preparation of 13X-R4, this monolith is denser than the 13X-R3 and 13X-R2 samples and its microporous texture requires high compressive force to deform micropore walls as compared to 13X-R3 and 13X-R2. In contrast, 13X-R2 exhibited the lowest compressive strength (0.3 MPa) as a result of higher mesopore volume than other monoliths.

TABLE 3

Mechanical testing data for 3D-printed monoliths.

| Sample | Compression strength (MPa) | Young's modulus |
|---|---|---|
| Monolith 13X-R2 | 0.30 | 7.50 |
| Monolith 13X-R3 | 0.45 | 10.0 |
| Monolith 13X-R4 | 0.69 | 15.0 |
| Monolith 5A-R2 | 0.05 | 1.65 |
| Monolith 5A-R3 | 0.17 | 5.75 |
| Monolith 5A-R4 | 0.35 | 9.45 |

Figure 12A:
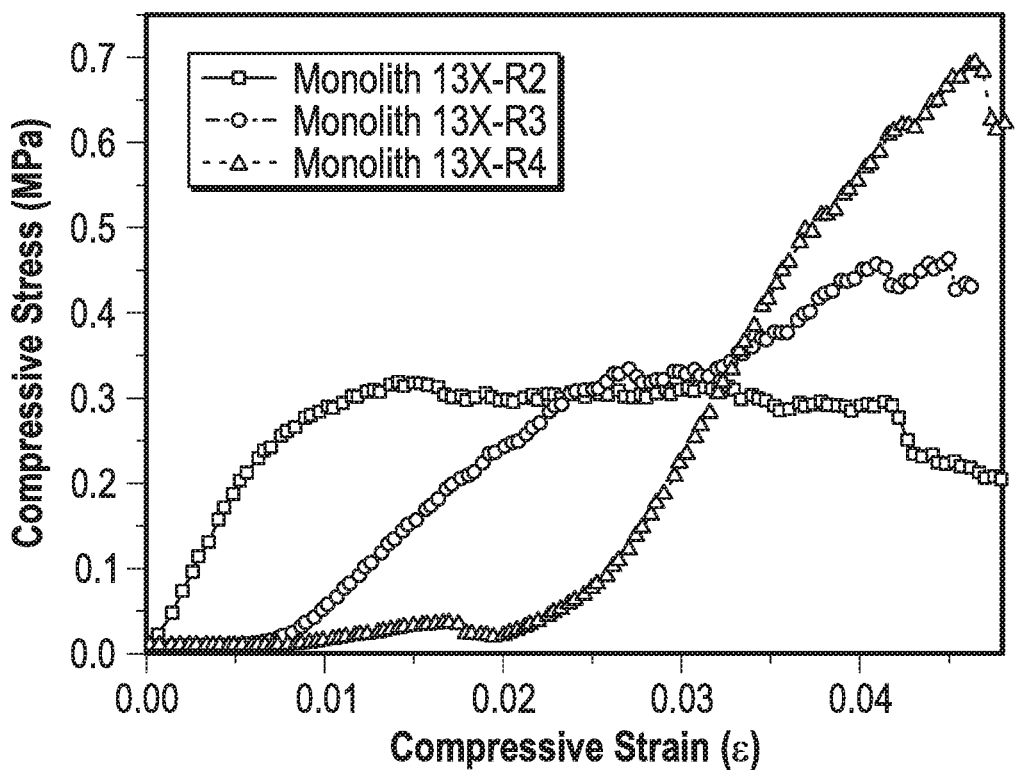
FIG. 12A illustrates the stress-strain curves for 13X-R2, 13X-R3, and 13X-R4 3D-printed zeolite monoliths, according to an example embodiment of the present disclosure.
Figure 12B:
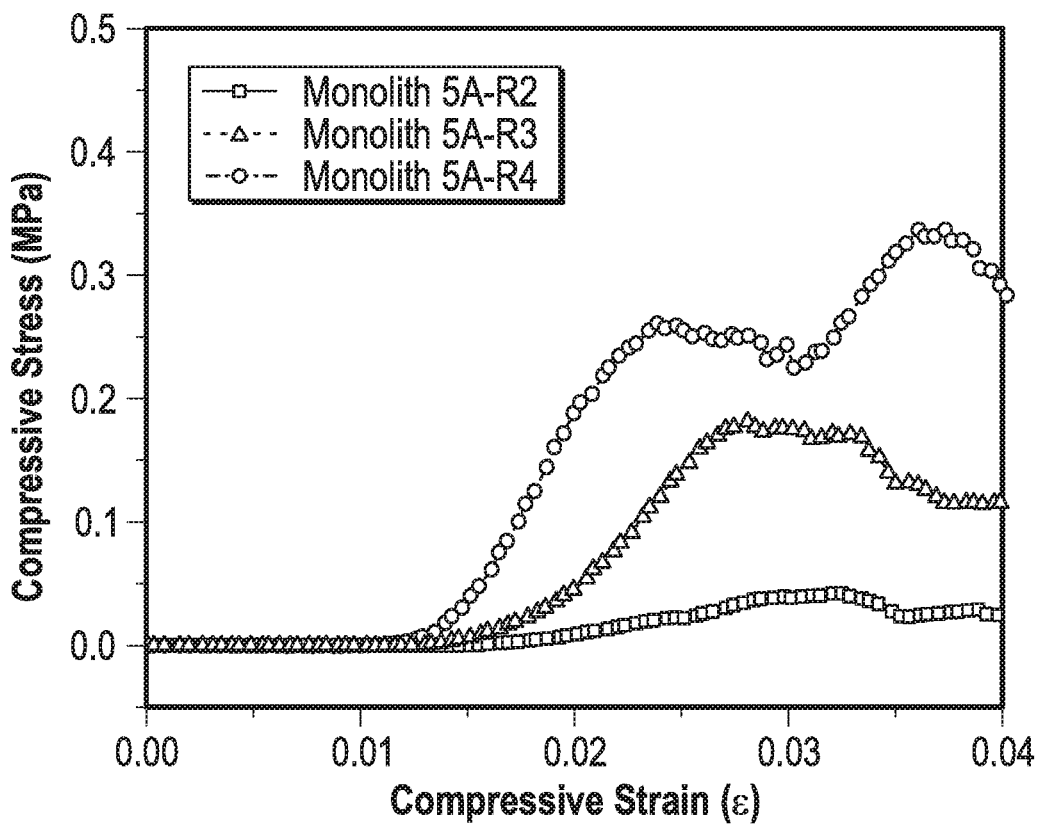
FIG. 12B illustrates the stress-strain curves for 5A-R2, 5A-R3, and 5A-R4 3D-printed zeolite monoliths, according to an example embodiment of the present disclosure.

FIG. 6 (bottom) illustrates the compressive strength of 5A-R2, 5A-R3 and 5A-R4 monoliths. As depicted in FIG. 6 (bottom), the compressive strength data shows a similar increasing trend with zeolite loading as for the 13X monoliths. However, compressive strengths of the 5A monoliths were much lower than that of 13X monoliths with the same zeolite loading which could be linked to their less dense structure. Maximum compressive stresses of 0.35, 0.15 and 0.5 MPa were recorded for 5A-R4, 5A-R3 and 5A-R2, respectively (see Table 3). The corresponding stress-strain curves are also shown in FIGS. 12A-B. Comparing the crush strength of the monoliths with that of 5A pellets used in NASA's $CO_2$ removal system revealed that the 3D monoliths have higher crush strength than the pellets. However, it should be noted that the single pellet crush tests on the NASA's 5A pellets were performed under humid conditions which could be a reason for having lower strength.

Equilibrium Adsorption Measurements

Figure 7:
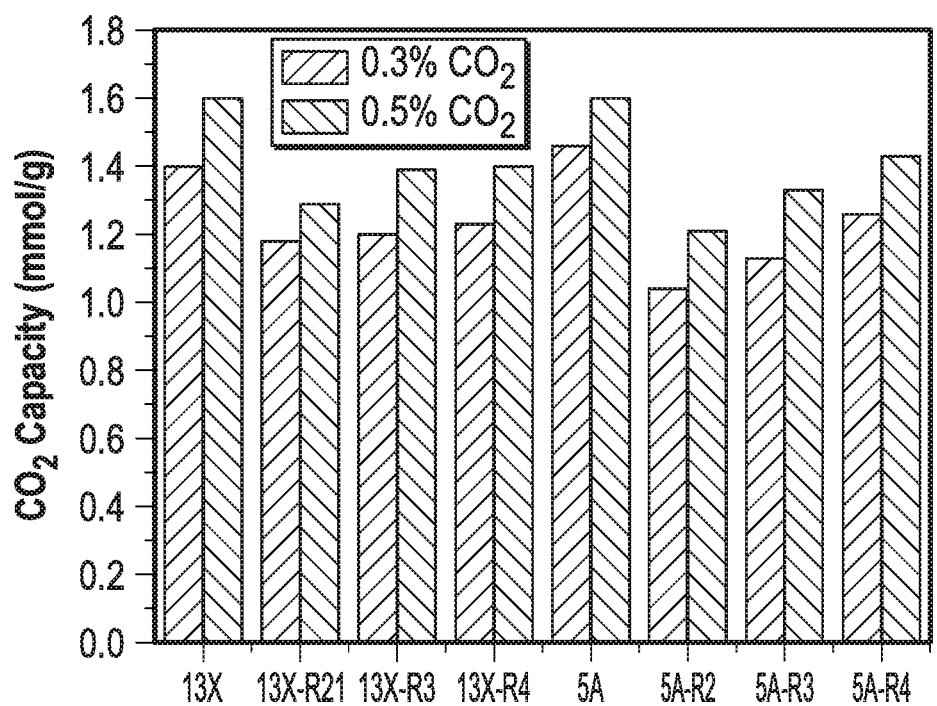
FIG. 7 illustrates the $CO_2$ adsorption capacities for 13X and 5A 3D-printed monoliths and zeolite powders obtained at 25° C. using 0.3% and 0.5% $CO_2$ in $N_2$, according to an example embodiment of the present disclosure.

The $CO_2$ adsorption capacity of 3D-printed monoliths was determined by TGA experiments at 25° C. and two different concentrations, namely 0.3% and 0.5% relevant to the $CO_2$ partial pressure in enclosed environments. FIG. 7 illustrates the $CO_2$ adsorption capacities for 13X and 5A 3D-printed monoliths and zeolite powders obtained at 25° C. using 0.3% and 0.5% $CO_2$ in $N_2$. As depicted in FIG. 7, the zeolite monoliths prepared by the presently disclosed 3D printing technique exhibit comparable capacity to the powder zeolites. In particular, for 0.5% $CO_2/N_2$, 13X-R4 showed a $CO_2$ uptake of 1.39 mmol/g which is 87% of that of 13X zeolite in the powder form, whereas, 5A-R4 exhibited 89% of the capacity of the 5A powder (1.43 mmol/g). Moreover, as can be seen from these results, increasing the zeolite/binder weight ratio resulted in the increased $CO_2$ adsorption capacity. This expected proportional $CO_2$ adsorption to zeolite loading in monolithic adsorbents could be attributed to the fact that equilibrium adsorption mainly takes place in micropores of the monoliths. Analyzing the micropore volumes of monoliths obtained from $N_2$ physisorption (Table 2) and $CO_2$ adsorption capacities (FIG. 7), it follows that the difference in adsorption uptake of monoliths are proportional to the difference in their micropore volumes. For instance, the adsorption capacity of 5A-R4 was 1.12 times higher than that of 5A-R3, while its micropore volume was 1.10 times higher.

Figure 8A:
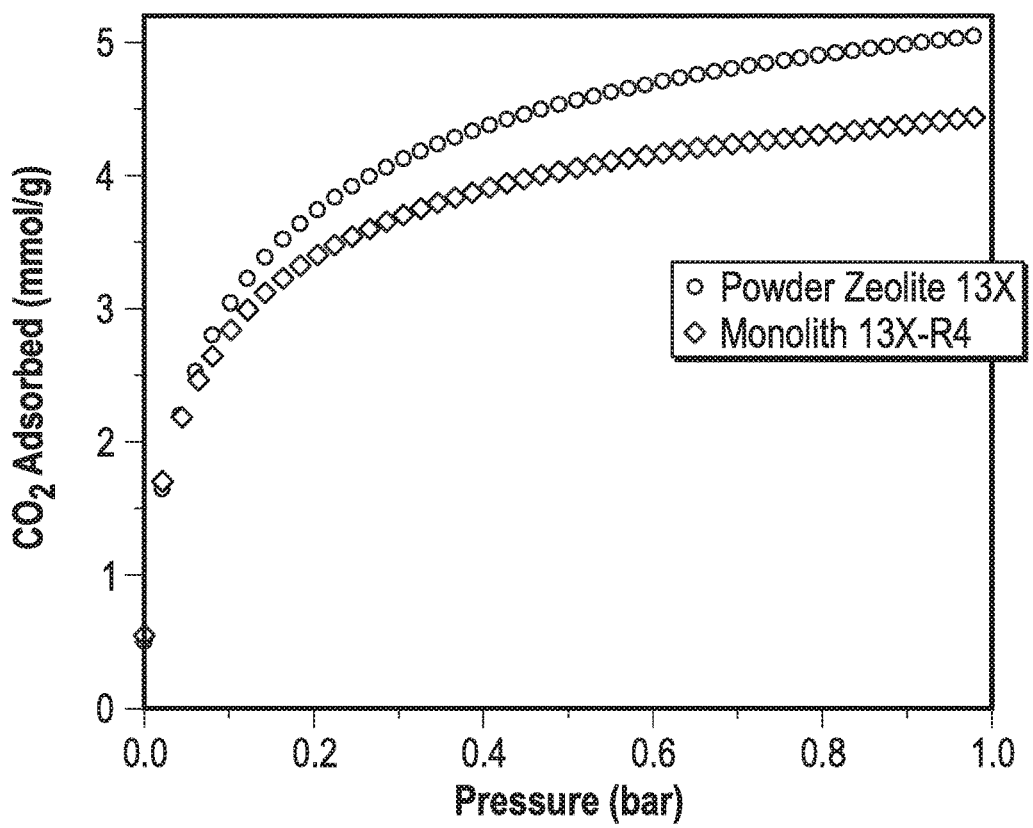
FIG. 8A illustrates the $CO_2$ adsorption isotherms for 13X-R4 3D-printed monoliths and 13X powdered zeolites obtained at 25° C., according to an example embodiment of the present disclosure.
Figure 8B:
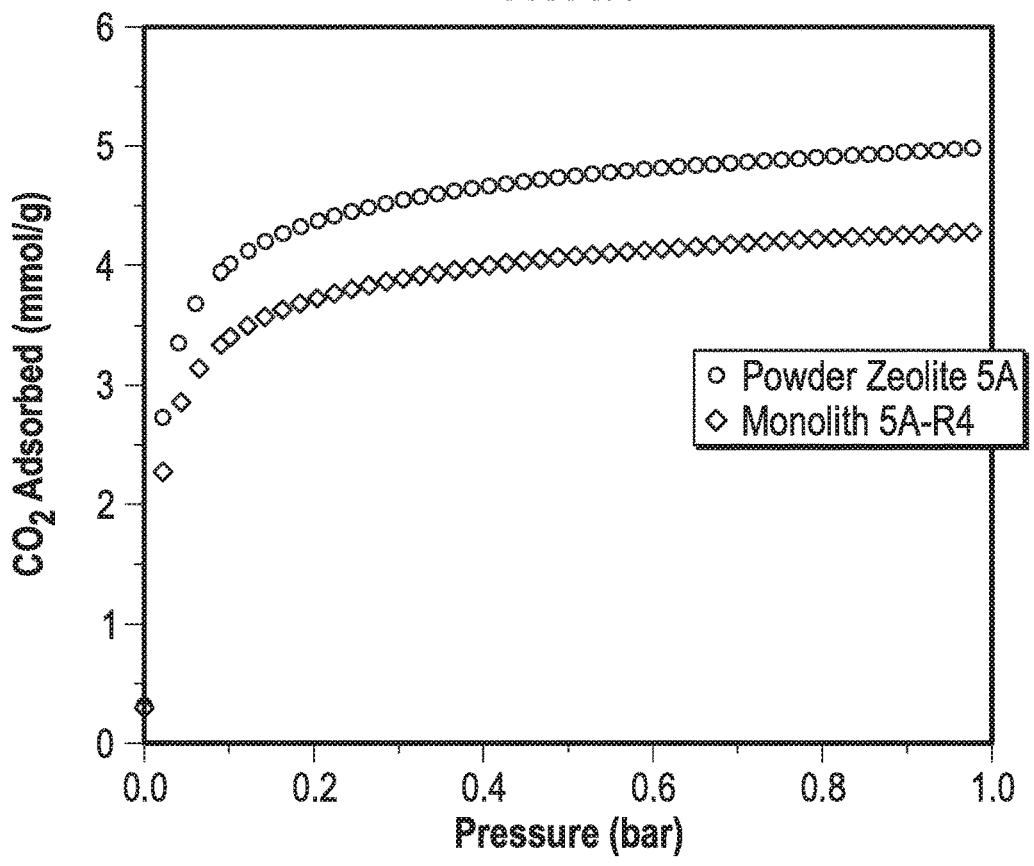
FIG. 8B illustrates the $CO_2$ adsorption isotherm for 5A-R4 3D-printed monoliths and 5A powdered zeolites obtained at 25° C., according to an example embodiment of the present disclosure.
Figure 8C:
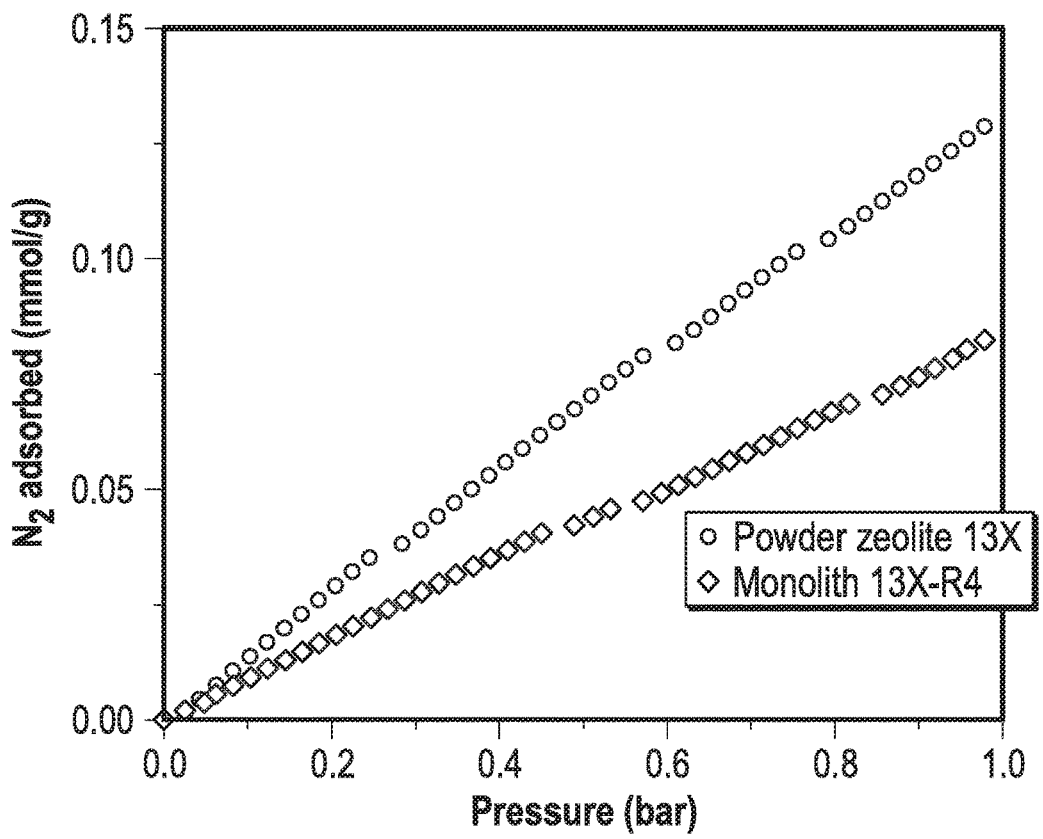
FIG. 8C illustrates the $N_2$ adsorption isotherms for 13X-R4 3D-printed monoliths and 13X powdered zeolites obtained at 25° C., according to an example embodiment of the present disclosure.
Figure 8D:
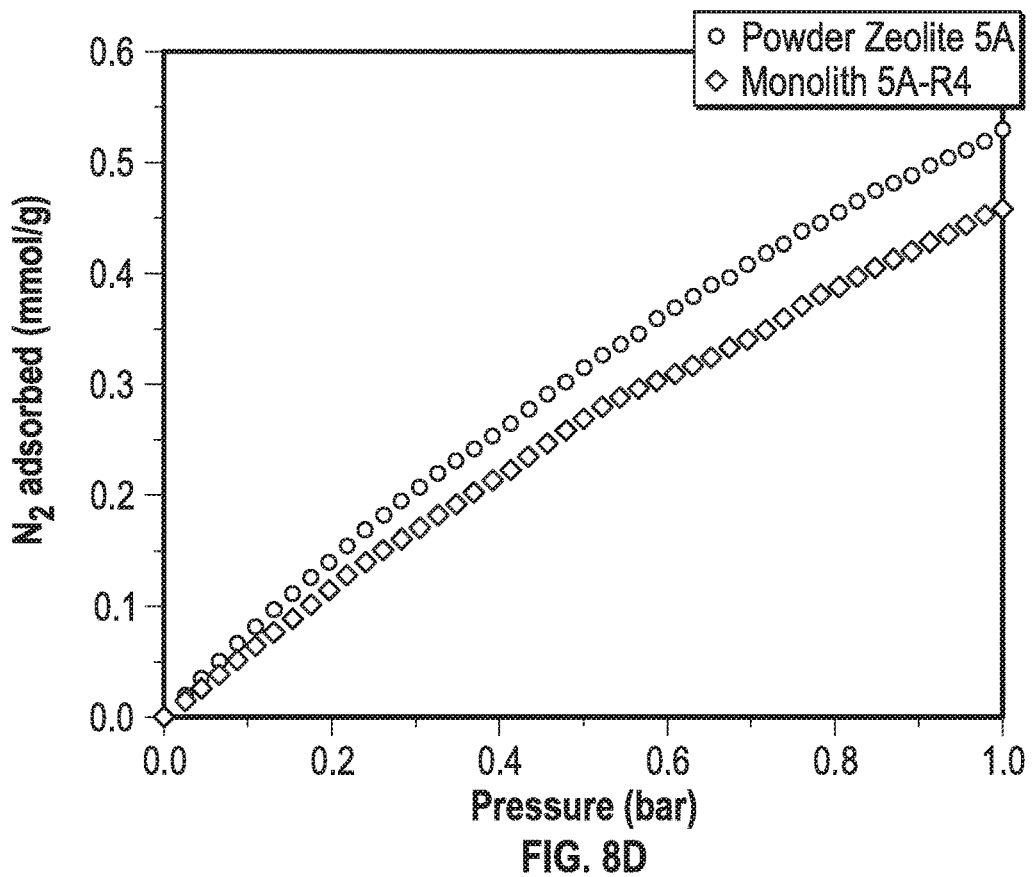
FIG. 8D shows the $N_2$ adsorption isotherms for 5A-R4 3D-printed monoliths and 5A powdered zeolites obtained at 25° C., according to an example embodiment of the present disclosure.

In addition to single point adsorption measurements, pure $CO_2$ and $N_2$ adsorption isotherms were obtained at 25° C. and 1 bar, as shown in FIGS. 8A-D. Specifically, FIG. 8A illustrates the $CO_2$ adsorption isotherms for 13X-R4 3D-printed monoliths and 13X powdered zeolites obtained at 25° C. FIG. 8B illustrates the $CO_2$ adsorption isotherm for 5A-R4 3D-printed monoliths obtained at 25° C. FIG. 8C illustrates the $N_2$ adsorption isotherms for 13X-R4 3D-printed monoliths and 13X powdered zeolites obtained at 25° C. FIG. 8D shows the $N_2$ adsorption isotherms for 5A-R4 3D-printed monoliths and 5A powdered zeolites obtained at 25° C.

The monoliths exhibited similar behavior to their powder counterparts, displaying high affinity towards $CO_2$ with negligible $N_2$ adsorption. Consistent with TGA tests, the $CO_2$ isotherms for 3D-printed monoliths were comparable to those for zeolite powders. The monoliths 13X-R4 and 5A-R4 displayed a sharp $CO_2$ uptake at low pressures reaching 88% and 75% of their equilibrium capacities at 0.2 bar, respectively, followed by gradual increase until full equilibrium at higher pressures was reached. Compared to other self-standing zeolite monoliths in the art, the presently disclosed 3D-printed monoliths show higher $CO_2$ uptake at room temperature.

$CO_2$ Breakthrough Experiments

Figure 9A:
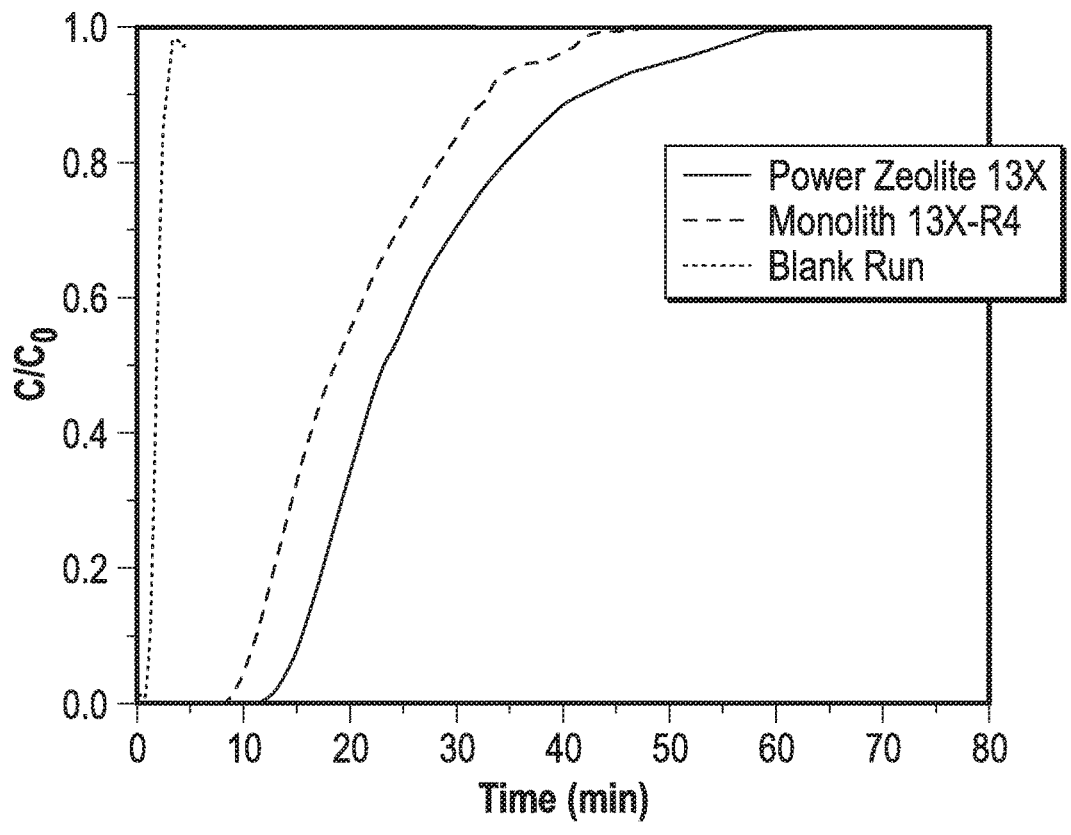
FIG. 9A shows breakthrough curves for 13X-R4 3D-printed zeolite monoliths as compared to 13X powder zeolite, obtained at 25° C. and 1 bar, according to an example embodiment of the present disclosure.
Figure 9B:
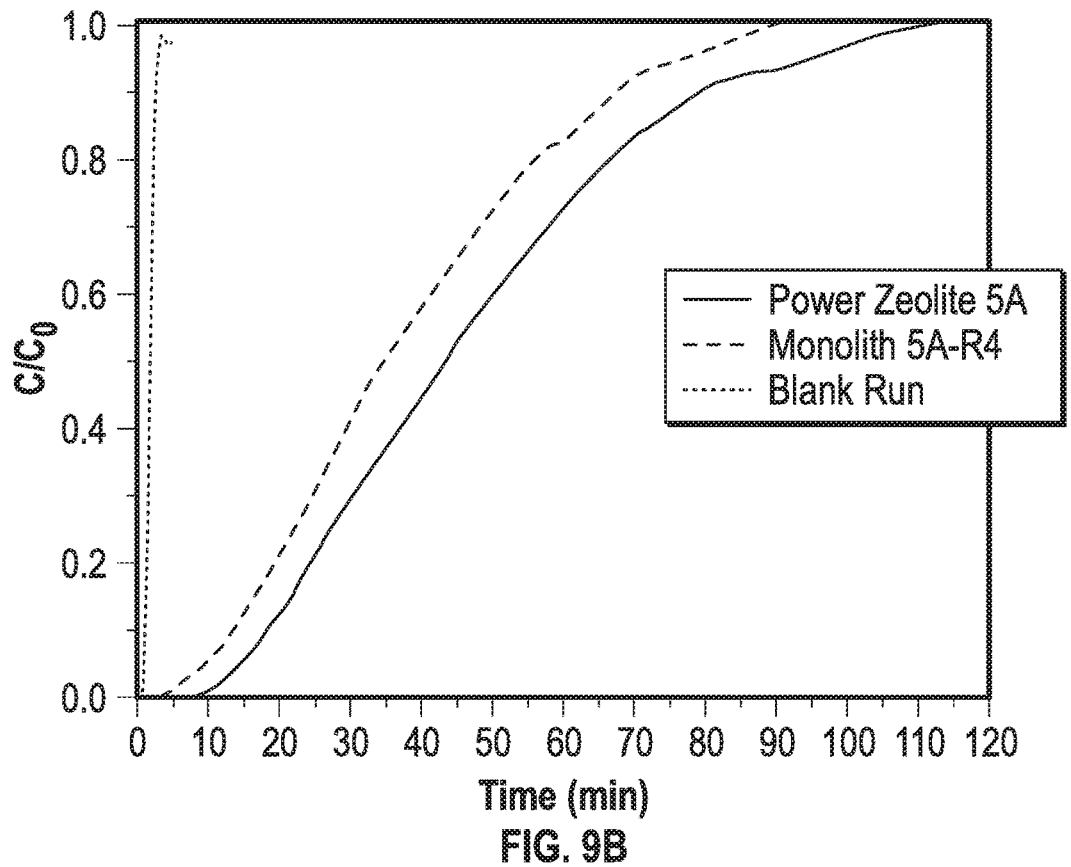
FIG. 9B illustrates breakthrough curves for 5A-R4 3D-printed zeolite monoliths as compared to 5A powder zeolite, obtained at 25° C. and 1 bar, according to an example embodiment of the present disclosure.

The dynamic adsorption performance of the presently disclosed zeolite monoliths and powders were evaluated at 25° C. and atmospheric pressure using a feed gas containing 0.5% $CO_2$ in $N_2$ with the flow rate of 60 mL/min. FIGS. 9A-B illustrate the corresponding $CO_2$ breakthrough profiles. Specifically, FIG. 9A shows breakthrough curves for 13X-R4 3D-printed zeolite monoliths as compared to 13X powder zeolite, obtained at 25° C. and 1 bar. FIG. 9B illustrates breakthrough curves for 5A-R4 3D-printed zeolite monoliths as compared to 5A powder zeolite, obtained at 25° C. and 1 bar.

For both 13X and 5A, the zeolite powders retained $CO_2$ longer and exhibited longer breakthrough times than their monolithic counterparts. However, the concentration fronts of 13X-R4 and 5A-R4 monoliths were sharper than those of powders with the breakthrough width of 36 minutes and 61 minutes, respectively (compared to 40 minutes and 75 minutes, for 13X and 5A powders, respectively) indicating less mass transfer resistance in monolithic beds. Here breakthrough width is defined as the difference between the time to reach 5% and 95% of the final composition. Table 4 tabulates the breakthrough times for the samples along with times to reach 50% and 95% of final concentration. Importantly, the dynamic capacities could be correlated to the zeolite loading and hence equilibrium adsorption capacity of the monoliths. The 13X powder attained 50% of the final concentration at 23 min which was 1.2 times longer than the time for 13X-R4 (23 minutes). This can be attributed to the difference in zeolite loading of the samples with 13X powder having 1.1 higher loading than the 13X monolith (see Table 1). The same trend could be realized for 5A samples.

TABLE 4

Data for 3D-printed monoliths and zeolite powders.

| Sample | $t_{5\%}$ (min) | $t_{50\%}$ (min) | $t_{95\%}$ (min) | Breakthrough width (min) |
|---|---|---|---|---|
| Powder zeolite 13X | 13 | 23 | 53 | 40 |
| Monolith 13X-R4 | 9 | 19 | 48 | 36 |
| Powder zeolite 5A | 15 | 44 | 90 | 75 |
| Monolith 5A-R4 | 9 | 36 | 70 | 61 |

The presently disclosed 13X and 5A zeolite monoliths with high zeolite content, fabricated according to the presently disclosed 3D printing techniques, comprise a network of interconnected micro, meso, and macropores of zeolite and binder particles, and are thus characterized by macro-meso-microporosity. Such macro-meso-microporous zeolite monoliths comprise a plurality of micropores having a diameter of greater than 15 nanometers and a plurality of mesopores having a diameter of from 2 nanometers to 15 nanometers. The presently disclosed 3D-printed zeolite monoliths, having macro-meso-microporosity, have surprisingly been found to exhibit unexpectedly high $CO_2$ adsorption and mechanical strength characteristic of improved $CO_2$ removal materials. The 3D-printed 5A and 13X monoliths with high zeolite loading (90 wt %) showed comparable $CO_2$ adsorption to their powder counterparts. More importantly, these novel structures gave rise to improved adsorption capacity and mechanical stability. By using 3D printing technique, it is possible to systematically tune the porosity, zeolite loading, and mechanical strength of monolithic structures. The presently disclosed $CO_2$ capture materials and 3D printing methods offers an alternative approach for fabricating $CO_2$ adsorbent materials in any configurations that can be used for various adsorptive-based separation processes.

Statements of the Disclosure Include:

Statement 1: A $CO_2$ capture material comprising one or more zeolite monoliths, the one or more zeolite monoliths comprising: a zeolite material selected from the group consisting of a 13X zeolite material and a 5A zeolite material; and one or more binders.

Statement 2: A $CO_2$ capture material according to Statement 1, wherein the zeolite monolith is prepared layer by layer using a 3D printer.

Statement 3: A $CO_2$ capture material according to Statement 1 or Statement 2, wherein the at least one zeolite monolith comprises at least 80 wt % zeolite material.

Statement 4: A $CO_2$ capture material according to Statement 1 or Statement 2, wherein the at least one zeolite monolith comprises at least 85 wt % zeolite material.

Statement 5: A $CO_2$ capture material according to Statement 1 or Statement 2, wherein the at least one zeolite monolith comprises at least 90 wt % zeolite material.

Statement 6: A $CO_2$ capture material according to any one of the preceding Statements 1-5, wherein the one or more binders is selected from the group consisting of bentonite clay, methyl cellulose, and any combination thereof.

Statement 7: A $CO_2$ capture material according to any one of the preceding Statements 1-6, wherein the one or more binders comprises from about 7 wt % to about 15 wt % of the one or more zeolite monoliths.

Statement 8: A $CO_2$ capture material according to any one of the preceding Statements 1-7, wherein the one or more binders comprises a plasticizing organic binder.

Statement 9: A $CO_2$ capture material according to Statement 8, wherein the plasticizing organic binder comprises from about 2.0 wt % to about 3.5 wt % of the one or more zeolite monoliths.

Statement 10: A $CO_2$ capture material according to Statement 8 or Statement 9, wherein the plasticizing organic binder is methyl cellulose.

Statement 11: A $CO_2$ capture material according to any one of the preceding Statements 1-10, wherein the one or more zeolite monoliths further comprises a co-binder.

Statement 12: A $CO_2$ capture material according to Statement 11, wherein the co-binder is polyvinyl alcohol.

Statement 13: A $CO_2$ capture material according to Statement 11 or Statement 12, wherein the co-binder comprises from about 1.0 wt % to about 1.5 wt % of the one or more zeolite monoliths.

Statement 14: A $CO_2$ capture material according to any one of the preceding Statements 1-13, wherein the one or more binders comprises from about 7 wt % and about 15 wt % bentonite clay and from about 2.0 wt % and about 3.5 wt % methyl cellulose.

Statement 15: A $CO_2$ capture material according to any one of the preceding Statements 1-14, wherein the one or more zeolite monoliths comprises a mesopore volume of at least about 0.009 $cm^3/g$.

Statement 16: A $CO_2$ capture material according to any one of the preceding Statements 1-14, wherein the one or more zeolite monoliths exhibits a mesopore volume of at least about 0.012 $cm^3/g$.

Statement 17: A $CO_2$ capture material according to any one of the preceding Statements 1-14, wherein the one or more zeolite monoliths comprises a mesoporosity of from about 0.009 $cm^3/g$ to about 0.020 $cm^3/g$.

Statement 18: A $CO_2$ capture material according to any one of the preceding Statements 1-14, wherein the one or more zeolite monoliths has a mesoporosity of from about 0.009 $cm^3/g$ to about 0.012 $cm^3/g$.

Statement 19: A $CO_2$ capture material according to any one of the preceding Statements 1-14, wherein the one or more zeolite monoliths has a mesoporosity of from about 0.012 $cm^3/g$ to about 0.020 $cm^3/g$.

Statement 20: A $CO_2$ capture material according to any one of the preceding Statements 1-19, wherein the one or more zeolite monoliths comprises a wall thickness of from about 0.4 mm to about 0.8 mm.

Statement 21: A $CO_2$ capture material according to any one of the preceding Statements 1-20, wherein the one or more zeolite monoliths comprises a channel width of from about 0.2 mm to about 0.6 mm.

Statement 22: A $CO_2$ capture material according to any one of the preceding Statements 1-21, wherein the one or more zeolite monoliths exhibits a compression strength of from about 0.30 MPa to about 0.69 MPa.

Statement 23: A $CO_2$ capture material according to any one of the preceding Statements 1-21, wherein the one or more zeolite monoliths exhibits a compression strength of from about 0.35 MPa to about 0.69 MPa.

Statement 24: A $CO_2$ capture material according to any one of the preceding Statements 1-23, wherein the one or more zeolite monoliths exhibits a Young's modulus of from about 7.50 MPa to about 15.0 MPa or from about 1.65 MPa to about 9.45 MPa.

Statement 25: A $CO_2$ capture material according to any one of the preceding Statements 1-24, wherein the one or more zeolite monoliths is characterized by the X-ray diffraction (XRD) pattern shown in FIG. 4A or FIG. 4B.

Statement 26: A $CO_2$ capture material according to any one of the preceding Statements 1-25, wherein the one or more zeolite monoliths is characterized by the thermogravimetry curves or differential thermogravimetry curves shown in FIG. 3A or FIG. 3B.

Statement 27: A $CO_2$ capture material according to any one of the preceding Statements 1-26, wherein the one or more zeolite monoliths is characterized by the pore size distribution curves shown in FIG. 2C or FIG. 2D.

Statement 28: A $CO_2$ capture material according to any one of the preceding statements 1-27, comprising a plurality of zeolite monoliths.

Statement 29: A $CO_2$ capture material according to any one of the preceding Statements 1-28, wherein the one or more zeolite monoliths is effective at capturing $CO_2$ from a gas or mixture of gases comprising about 5% or less $CO_2$.

Statement 30: A $CO_2$ capture material comprising one or more zeolite monoliths characterized by the X-ray diffraction (XRD) pattern shown in FIG. 4A or FIG. 4B.

Statement 31: A $CO_2$ capture material comprising one or more zeolite monoliths characterized by the thermogravimetry curves or differential thermogravimetry curves shown in FIG. 3A or FIG. 3B.

Statement 32: A $CO_2$ capture material comprising one or more zeolite monoliths characterized by the pore size distribution curves shown in FIG. 2C or FIG. 2D.

Statement 33: A device for removing $CO_2$ from a gas or mixture of gases in an enclosed compartment, the device comprising: a filter comprising a $CO_2$ capture material according to any one of the claims; and a means for causing a gas or mixture of gases to contact the filter comprising a $CO_2$ capture material.

Statement 34: A method of preparing a 3D-printed zeolite monolith, the method comprising: mixing zeolite powder, bentonite clay, a plasticizing organic binder, and a co-binder using a high-performance dispersing instrument at 2500 rpm to obtain a powder mixture; adding a sufficient amount of distilled water to the powder mixture and mixing using the high-performance dispersing instrument at 2500 rpm to form an aqueous paste; and depositing the aqueous paste layer-by-layer, using a 3D-printing apparatus, onto a substrate to produce a 3D-printed zeolite monolith.

Statement 35: A method according to Statement 34, wherein the zeolite powder is selected from the group consisting of a 13X zeolite powder and a 5A zeolite powder.

Statement 36: A method according to Statement 34 or Statement 35, wherein the plasticizing organic binder is methyl cellulose.

Statement 37: A method according to any one of the preceding Statements 34-36, wherein the co-binder is polyvinyl alcohol.

Statement 38: A method for removing $CO_2$ from a gas or mixture of gases comprising 5% or less $CO_2$, the method comprising: bringing a gas or mixture of gases comprising carbon dioxide in contact with a $CO_2$ capture material according to any one of the claims; and capturing at least a portion of the $CO_2$ in the gas or mixture of gases in the $CO_2$ capture material.

Statement 39: A method according to Statement 38, wherein $CO_2$ is removed from a gas or mixture of gases in an enclosed compartment.

Statement 40: A method according to Statement 39, wherein the enclosed compartment is selected from the group consisting of a submarine compartment, a spacecraft compartment, a building, and a dwelling.

We claim:

1. A $CO_2$ capture material comprising one or more zeolite monoliths, the one or more zeolite monoliths comprising:
   a zeolite material selected from the group consisting of a 13X zeolite material and a 5A zeolite material;
   bentonite clay; and
   organic binders, wherein the organic binders comprise a plasticizing organic binder and an organic co-binder that is different from the plasticizing organic binder.

2. The $CO_2$ capture material according to claim 1, wherein the one or more zeolite monoliths is prepared layer by layer using a 3D printer.

3. The $CO_2$ capture material according to claim 1, wherein the one or more zeolite monoliths comprises at least 80 wt % zeolite material.

4. The $CO_2$ capture material according to claim 1, wherein the plasticizing organic binder comprises methyl cellulose.

5. The $CO_2$ capture material according to claim 1, wherein the one or more zeolite monoliths comprises from about 7 wt % to about 15 wt % of bentonite clay.

6. The $CO_2$ capture material according to claim 1, wherein the organic co-binder comprises polyvinyl alcohol.

7. The $CO_2$ capture material according to claim 1, wherein the one or more zeolite monoliths exhibits a mesopore volume of at least about 0.009 $cm^3/g$.

8. The $CO_2$ capture material according to claim 1, wherein the one or more zeolite monoliths has a mesoporosity of from about 0.009 $cm^3/g$ to about 0.020 $cm^3/g$.

9. The $CO_2$ capture material according to claim 1, wherein the one or more zeolite monoliths comprises a wall thickness of from about 0.4 mm to about 0.8 mm.

10. The $CO_2$ capture material according to claim 1, wherein the one or more zeolite monoliths comprises a channel width of from about 0.2 mm to about 0.6 mm.

11. The $CO_2$ capture material according to claim 1, wherein the one or more zeolite monoliths exhibits a compression strength of from about 0.30 MPa to about 0.69 MPa.

12. The $CO_2$ capture material according to claim 1, wherein the one or more zeolite monoliths exhibits a Young's modulus of from about 7.50 MPa to about 15.0 MPa or from about 1.65 MPa to about 9.45 MPa.

13. The $CO_2$ capture material according to claim 1, wherein the plasticizing organic binder comprises methyl cellulose and the organic co-binder comprises polyvinyl alcohol.

14. A $CO_2$ capture material comprising one or more zeolite monoliths, the one or more zeolite monoliths comprising:
   a zeolite material selected from the group consisting of a 13X zeolite material and a 5A zeolite material; and
   binders, wherein the binders comprise from about 7 wt % to about 15 wt % bentonite clay and from about 2.0 wt % to about 3.5 wt % methyl cellulose.

15. A method for removing $CO_2$ from a gas or mixture of gases comprising 5% or less $CO_2$, the method comprising:
   bringing a gas or mixture of gases comprising carbon dioxide in contact with a $CO_2$ capture material; and
   capturing at least a portion of the $CO_2$ in the gas or mixture of gases in the $CO_2$ capture material;
   wherein the $CO_2$ capture material comprises one or more zeolite monoliths, the one or more zeolite monoliths comprising:
   a zeolite material;
   bentonite clay; and
   organic binders, wherein the organic binders comprise methyl cellulose and polyvinyl alcohol;
   wherein the one or more zeolite monoliths is prepared layer by layer using a 3D printer.

16. The method according to claim 15, wherein $CO_2$ is removed from a gas or mixture of gases in an enclosed compartment.

17. The method according to claim 16, wherein the enclosed compartment is selected from the group consisting of a submarine compartment, a spacecraft compartment, a building, and a dwelling.

18. The method according to claim 15, wherein the zeolite material is selected from the group consisting of a 13X zeolite material and a 5A zeolite material.

* * * * *